(12) United States Patent
Sato et al.

(10) Patent No.: US 10,955,705 B2
(45) Date of Patent: Mar. 23, 2021

(54) WEARABLE DISPLAY DEVICE COMPRISING AN OPTICALLY-ANISOTROPIC LAYER HAVING LIQUID CRYSTAL COMPOUNDS WITH OPTICAL AXES CONTINUOUSLY ROTATING ALONG AT LEAST ONE IN-PLANE DIRECTION

(71) Applicant: FUJIFILM Corporation, Tokyo (JP)

(72) Inventors: Hiroshi Sato, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/730,422

(22) Filed: Dec. 30, 2019

(65) Prior Publication Data
US 2020/0142200 A1 May 7, 2020

Related U.S. Application Data

(63) Continuation of application No. PCT/JP2018/024523, filed on Jun. 28, 2018.

(30) Foreign Application Priority Data

Jun. 30, 2017 (JP) .............................. JP2017-129618

(51) Int. Cl.
*G02F 1/13363* (2006.01)
*G02B 27/01* (2006.01)
(Continued)

(52) U.S. Cl.
CPC ..... *G02F 1/13363* (2013.01); *G02B 27/0172* (2013.01); *G02F 1/116* (2013.01); *G02B 5/3016* (2013.01); *G02F 1/015* (2013.01)

(58) Field of Classification Search
CPC .. G02F 1/015; G02F 1/116; G02F 2001/0151; G02B 27/02
See application file for complete search history.

(56) References Cited

U.S. PATENT DOCUMENTS

| 5,548,427 A | * | 8/1996 | May | ......................... | G02B 5/32 |
| | | | | | 349/117 |
| 8,643,822 B2 | * | 2/2014 | Tan | ...................... | G11B 7/1353 |
| | | | | | 349/202 |

(Continued)

FOREIGN PATENT DOCUMENTS

| JP | 2004-198693 A | 7/2004 |
| JP | 2016-139112 A | 8/2016 |

(Continued)

OTHER PUBLICATIONS

International Preliminary Report on Patentability and English translation of the Written Opinion of the International Searching Authority for International Application No. PCT/JP2018/024523, dated Jan. 9, 2020.

(Continued)

*Primary Examiner* — Paul C Lee
(74) *Attorney, Agent, or Firm* — Birch, Stewart, Kolasch & Birch, LLP

(57) ABSTRACT

A wearable display device 1 includes a display panel 11, an eyepiece 31, and an optical element 21 that is disposed between the display panel 11 and the eyepiece 31, in which the optical element 21 includes an optically-anisotropic layer 23 that is formed of a cured layer of a composition including a liquid crystal compound 24, and the optically-anisotropic layer 23 has a liquid crystal alignment pattern AP1 in which a direction of an optical axis derived from the liquid crystal compound 24 changes while continuously rotating along at least one in-plane direction of the optically-anisotropic layer 23.

20 Claims, 10 Drawing Sheets

(51) Int. Cl.
*G02F 1/11* (2006.01)
*G02B 5/30* (2006.01)
*G02F 1/015* (2006.01)

(56) References Cited

U.S. PATENT DOCUMENTS

| | | | |
|---|---|---|---|
| 2005/0285997 A1* | 12/2005 | Koyama | H04N 13/31 349/117 |
| 2012/0092594 A1* | 4/2012 | Toyama | G02B 5/3025 349/96 |
| 2012/0249900 A1* | 10/2012 | Koike | G02F 1/133528 349/15 |
| 2013/0093968 A1* | 4/2013 | Yanai | G02F 1/1347 349/15 |
| 2014/0375927 A1* | 12/2014 | Ishiguro | G02F 1/133602 349/61 |
| 2016/0011352 A1* | 1/2016 | Saitoh | G02B 5/3016 257/98 |
| 2016/0377776 A1 | 12/2016 | Ichihashi | |
| 2017/0003525 A1* | 1/2017 | Tatsuzawa | G02F 1/1337 |
| 2018/0157068 A1 | 6/2018 | Yanai et al. | |
| 2018/0275398 A1 | 9/2018 | Kikuchi et al. | |

FOREIGN PATENT DOCUMENTS

| | | |
|---|---|---|
| JP | 2016-206512 A | 12/2016 |
| JP | 2016206512 A * | 12/2016 |
| WO | WO 2015/141759 A1 | 9/2015 |
| WO | WO 2017/022592 A1 | 2/2017 |
| WO | WO-2017022591 A1 * | 2/2017 ......... G02F 1/13363 |

OTHER PUBLICATIONS

International Search Report for International Application No. PCT/JP2018/024523, dated Sep. 18, 2018, with English translation.

* cited by examiner

US 10,955,705 B2

WEARABLE DISPLAY DEVICE COMPRISING AN OPTICALLY-ANISOTROPIC LAYER HAVING LIQUID CRYSTAL COMPOUNDS WITH OPTICAL AXES CONTINUOUSLY ROTATING ALONG AT LEAST ONE IN-PLANE DIRECTION

CROSS-REFERENCE TO RELATED APPLICATIONS

This application is a Continuation of PCT International Application No. PCT/JP2018/024523 filed on Jun. 28, 2018, which claims priority under 35 U.S.C. § 119(a) to Japanese Patent Application No. 2017-129618 filed on Jun. 30, 2017. The above application is hereby expressly incorporated by reference, in its entirety, into the present application.

BACKGROUND OF THE INVENTION

1. Field of the Invention

The present invention relates to a wearable display device in which the visual recognition of a pixel grid is prevented.

2. Description of the Related Art

Recently, a wearable display device such as a head-mounted display has been widely used. This wearable display device is a device that displays an image in the very vicinity of the eyes of a user using an extended optical system employing a virtual image. In addition, in the wearable display device, in order to display an image at a wide viewing angle in front of the eyes of the user, for example, an eyepiece for enlarging an image displayed on a display panel is used.

This way, in the wearable display device, in a case where the image displayed on the display panel is enlarged using the eyepiece or the like, a pixel grid included in the display panel is also enlarged together with the image, and the pixel grid of the display panel is visually recognized by the user. As a result, the quality of the image may deteriorate. In JP2016-139112A, a microlens array sheet is disposed between a display panel and an eyepiece to diffuse light from the display panel such that a pixel grid is prevented from being visually recognized by the user.

SUMMARY OF THE INVENTION

However, in the technique disclosed in JP2016-139112A, light emitted from the display panel is diffused using the microlens array. Therefore, secondary or higher diffracted light is generated from boundary surfaces of the microlens array. As a result, light components emitted from the display panel through a plurality of pixels are mixed with each other, and there is a problem in that the sharpness of an image deteriorates.

The present invention has been made in order to solve the above-described problems of the related art, and an object thereof is to provide a wearable display device in which a pixel grid of a display panel is prevented from being visually recognized by a user and the sharpness of an image to be visually recognized by the user is maintained favorably.

According to the present invention, there is provided a wearable display device comprising: a display panel including a plurality of pixels; and an eyepiece for enlarging light emitted from the display panel through the plurality of pixels; and an optical element that is disposed between the display panel and the eyepiece, in which the optical element includes an optically-anisotropic layer that is formed of a cured layer of a composition including a liquid crystal compound, and the optically-anisotropic layer has a liquid crystal alignment pattern in which a direction of an optical axis derived from the liquid crystal compound changes while continuously rotating along at least one in-plane direction of the optically-anisotropic layer.

It is preferable that, in a case where a difference in refractive index generated by refractive index anisotropy of the liquid crystal compound at a wavelength of 550 nm is represented by $\Delta n_{550}$ and a thickness of the optically-anisotropic layer is represented by d, the following Expression (1) is satisfied.

$$50\text{nm} \le \Delta n_{550} \times d \le 350\text{nm} \tag{1}$$

It is preferable that, in a case where a difference in refractive index generated by refractive index anisotropy of the liquid crystal compound at a wavelength of 450 nm is represented by $\Delta n_{450}$, a difference in refractive index generated by refractive index anisotropy of the liquid crystal compound at a wavelength of 550 nm is represented by $\Delta n_{550}$, and a thickness of the optically-anisotropic layer is represented by d, the following Expression (2) is satisfied.

$$(\Delta n_{450} \times d)/(\Delta n_{550} \times d) < 1.00 \tag{2}$$

In addition, it is preferable that the liquid crystal compound is a rod-shaped liquid crystal compound.

Alternatively, the liquid crystal compound may be a disk-shaped liquid crystal compound.

In addition, it is preferable that the direction in which the direction of the optical axis changes while continuously rotating is parallel to a direction in which the plurality of pixels of the display panel are arranged.

The wearable display device according to the present invention includes an optical element that is disposed between the display panel and the eyepiece, in which the optical element includes an optically-anisotropic layer that is formed of a composition including a liquid crystal compound, and the optically-anisotropic layer has a liquid crystal alignment pattern in which a direction of an optical axis derived from the liquid crystal compound changes while continuously rotating along at least one in-plane direction of the optically-anisotropic layer. Therefore, the pixel grid of the display panel can be prevented from being visually recognized by the user, and the sharpness of an image to be visually recognized by the user can be maintained.

DESCRIPTION OF THE PREFERRED EMBODIMENTS

Hereinafter, an embodiment of a wearable display device according to the present invention will be described with reference to the drawings. In each of the drawings, for easy visual recognition, the reduced scale of components is different from the actual scale.

Figure 1:
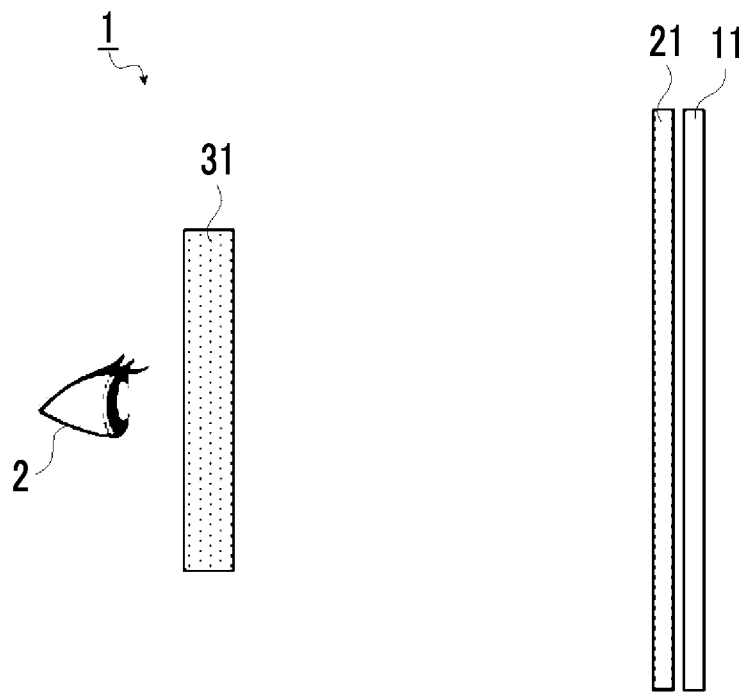
FIG. 1 is a diagram illustrating a schematic configuration of a wearable display device according to Embodiment 1 of the present invention.

FIG. 1 is a diagram illustrating a schematic configuration of a wearable display device 1 according to Embodiment 1 of the present invention. The wearable display device 1 includes: a display panel 11 for displaying an image; an eyepiece 31 for collecting light emitted from the display panel 11; and an optical element 21 that is disposed between the display panel 11 and the eyepiece 31. In a case where a user uses the wearable display device 1, the eyepiece 31 is disposed in the very vicinity of an eye 2 of the user. Therefore, an image that is displayed on the display panel 11 and is enlarged by the eyepiece 31 is visually recognized by the user.

Figure 2:
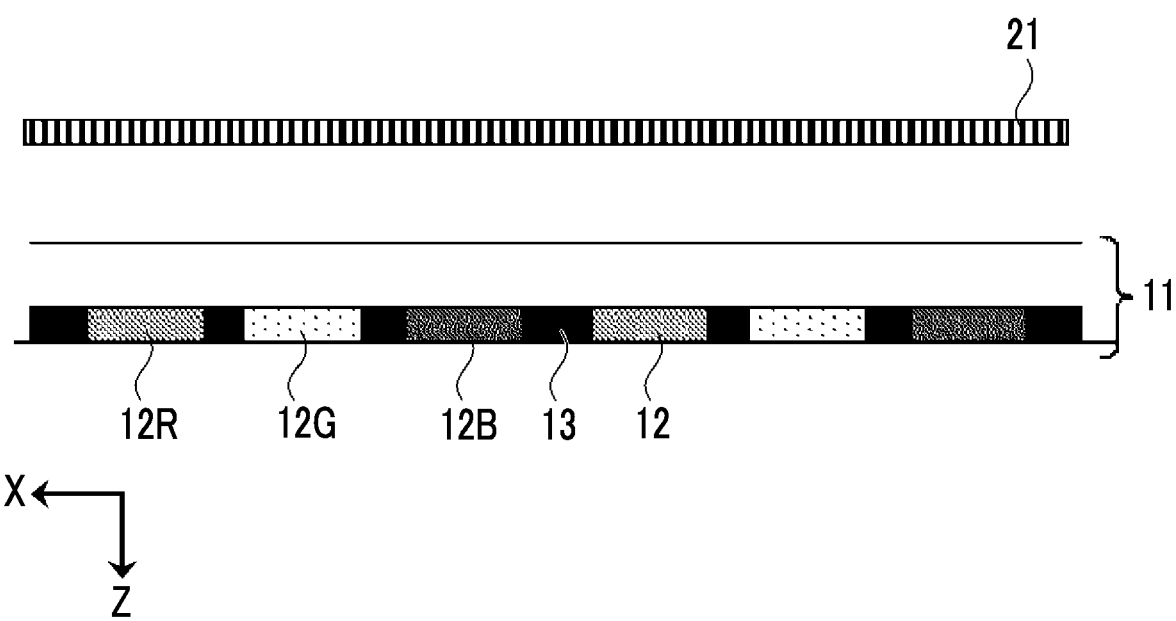
FIG. 2 is a partial side cross-sectional view illustrating a display panel and an optical element according to Embodiment 1 of the present invention.

FIG. 2 is a partial side cross-sectional view illustrating the display panel 11 and the optical element 21. As illustrated in FIG. 2, the display panel 11 includes a plurality of pixels 12 and a pixel grid 13 disposed between the plurality of pixels 12 adjacent to each other. The plurality of pixels 12 includes a plurality of red pixels 12R, a plurality of green pixels 12G, and a plurality of blue pixels 12B. The display panel 11 emits light toward the optical element 21 through the plurality of pixels 12.

Here, for convenience of description, a direction from the optical element 21 toward the display panel 11 will be referred to as "+Z direction", a plane perpendicular to the Z direction will be referred to as "XY plane", and it is assumed that the display panel 11 and the optical element 21 are disposed parallel to the XY plane. FIG. 2 illustrates a state where the plurality of red pixels 12R, the plurality of green pixels 12G, and the plurality of blue pixels 12B of the display panel 11 are repeatedly arranged in an X direction in this order.

Figure 3:
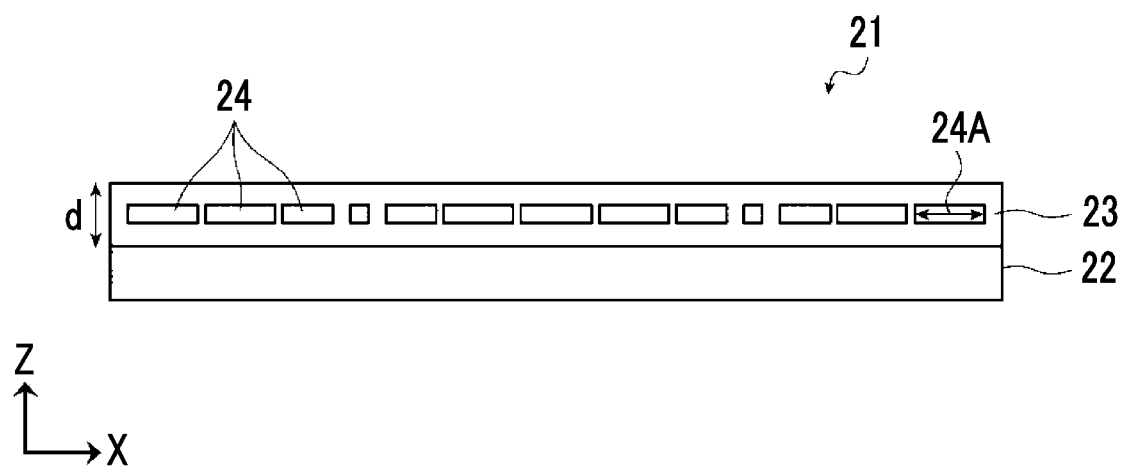
FIG. 3 is a partial side cross-sectional view illustrating the optical element according to Embodiment 1 of the present invention.

FIG. 3 is a partial side cross-sectional view illustrating the optical element 21. As illustrated in FIG. 3, the optical element 21 includes a transparent support 22 such as a plastic film and an optically-anisotropic layer 23 having a thickness d. In a case where an in-plane retardation value is set as $\lambda/4$, the optically-anisotropic layer 23 has a function of a general $\lambda/4$ plate, that is, a function of imparting a phase difference of a ¼ wavelength, that is, 90° to two linearly polarized light components that are included in light incident into the optically-anisotropic layer 23 and are perpendicular to each other. In a case where an in-plane retardation value is set as $\lambda/2$, the optically-anisotropic layer 23 has a function of a general $\lambda/2$ plate, that is, a function of imparting a phase difference of a half wavelength, that is, 180° to two linearly polarized light components that are included in light incident into the optically-anisotropic layer 23 and are perpendicular to each other. In addition, the optically-anisotropic layer 23 is formed using a composition including a plurality of rod-shaped liquid crystal compounds 24 as liquid crystal compounds. Each of the plurality of rod-shaped liquid crystal compounds 24 is aligned in a plane parallel to an XY plane in the optically-anisotropic layer 23.

In addition, the optically-anisotropic layer 23 has an optical axis 24A derived from the rod-shaped liquid crystal compound 24 (hereinafter, also referred to as "the optical axis 24A of the rod-shaped liquid crystal compound"). This optical axis 24A is aligned along a rod-shaped major axis direction of the rod-shaped liquid crystal compound 24 and is an axis having the highest refractive index in the rod-shaped liquid crystal compound 24, that is, a so-called slow axis.

Figure 4:
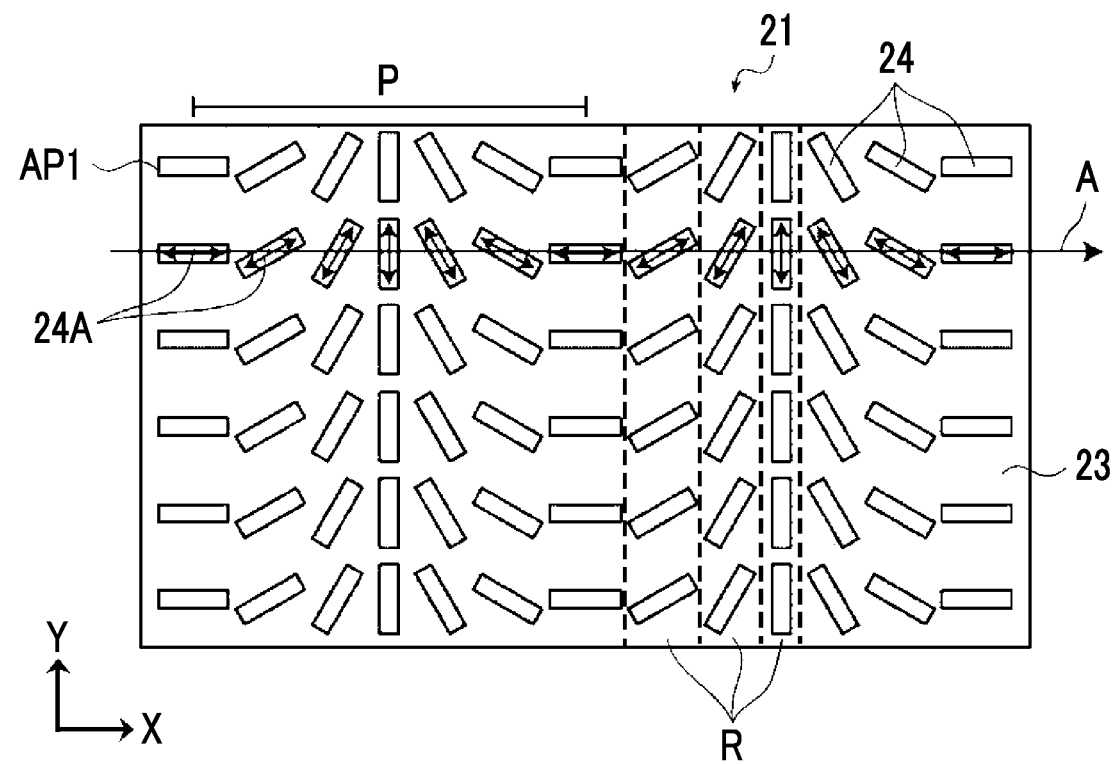
FIG. 4 is a partial plan view illustrating the optical element according to Embodiment 1 of the present invention.

FIG. 4 is a partial plan view illustrating the optical element 21. As illustrated in FIG. 4, the plurality of rod-shaped liquid crystal compounds 24 of the optically-anisotropic layer 23 are arranged along a plurality of arrangement axes parallel to each other in the XY plane. On each of the arrangement axes A, a direction of each of the optical axes 24A of the plurality of rod-shaped liquid crystal compounds 24 changes while continuously rotating in one direction along the arrangement axis A. Here, for convenience of description, it is assumed that the arrangement axis is aligned in the X direction. In addition, in the Y direction, the plurality of rod-shaped liquid crystal compounds 24 in which the directions of the optical axes 24A are the same are arranged at regular intervals.

In addition, the direction of the optical axis 24A of the rod-shaped liquid crystal compound 24 changing while continuously rotating in one direction along the arrangement axis A represents that an angle between each of the optical axes 24A of the plurality of rod-shaped liquid crystal compounds 24 arranged along the arrangement axes A and the arrangement axis A varies depending on positions in the arrangement axis A direction and gradually changes from θ to θ+180° or θ-180°. At this time, as illustrated in FIG. 4, the optical axes 24A of the plurality of rod-shaped liquid crystal compounds 24 can change while rotating by a predetermined angle along the arrangement axes A. A difference between the angles of the optical axes 24A of the rod-shaped liquid crystal compound 24 adjacent to each other along the arrangement axes A is preferably 45° or less and more preferably less than 45°.

In addition, a liquid crystal alignment pattern AP1 is formed in the optically-anisotropic layer 23 by the directions of the optical axes 24A of the plurality of rod-shaped liquid crystal compounds 24 changing while continuously rotating along the arrangement axes A. The liquid crystal alignment pattern AP1 is a pattern that is repeated along the arrangement axis A, and a pitch P thereof is defined by the distance in which the angle between the optical axis 24A of the rod-shaped liquid crystal compound 24 and the arrangement axis A changes from θ to θ+180°. The length of the pitch P is about the same as a pitch of a diffraction grating for visible light that is generally used and specifically is preferably 45 μm or less, more preferably 30 μm or less, and still more preferably 15 μm or less.

In addition, as illustrated in FIG. 4, in the optically-anisotropic layer 23, a region including a plurality of optical axes 24A arranged in one line along the Y direction will be referred to as "region R". The plurality of optical axes 24A included in the region R are aligned in the same direction. In this case, an in-plane retardation value in each of the regions R is λ/4 in the case of a ¼ wavelength and is λ/2 in the case of a half wavelength with respect to a designed wavelength. The in-plane retardation is calculated from the product of a difference Δn in refractive index generated by refractive index anisotropy of the region R and the thickness d of the optically-anisotropic layer 23. Here, the difference in refractive index generated by refractive index anisotropy of the region R in the optically-anisotropic layer 23 is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the rod-shaped liquid crystal compound 24 in the direction of the optical axis 24A and a refractive index of the rod-shaped liquid crystal compound 24 in a direction perpendicular to the optical axis 24A in a plane of the region R.

Figure 5:
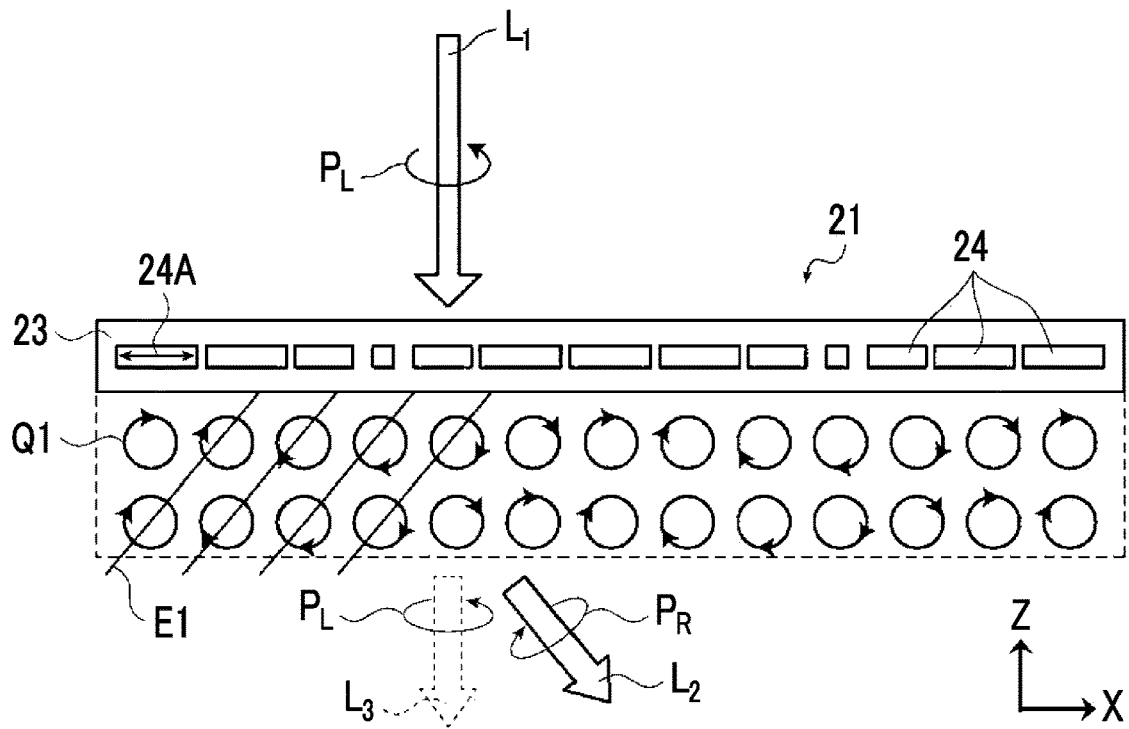
FIG. 5 is a diagram illustrating the behavior of transmitted light in a case where left circularly polarized light is incident into the optical element according to Embodiment 1 of the present invention.

Next, in a case where light is incident into the optically-anisotropic layer 23 of the optical element 21 according to Embodiment 1, the behavior of transmitted light will be described. As illustrated in FIG. 5, in a case where the in-plane retardation value of the optically-anisotropic layer 23 is λ/2 and incidence light $L_1$ of left circularly polarized light $P_L$ is incident into the optically-anisotropic layer 23 of the optical element 21, the incidence light $L_1$ transmits through the optically-anisotropic layer 23 to be imparted with a phase difference of 180° and is converted into transmitted light $L_2$ of right circularly polarized light $P_R$. In addition, in a case where the incidence light $L_1$ transmits through the optically-anisotropic layer 23, an absolute phase thereof changes depending on the direction of the optical axis 24A derived from each of the rod-shaped liquid crystal compounds 24. At this time, the optical axis 24A changes while rotating along the arrangement axis A. Therefore, a variation in the absolute phase of the incidence light $L_1$ varies depending on the direction of the optical axis 24A. Further, the liquid crystal alignment pattern AP1 that is formed in the optically-anisotropic layer 23 is a pattern that is periodic in the X direction. Therefore, as illustrated in FIG. 5, the incidence light $L_1$ transmitted through the optically-anisotropic layer 23 is imparted with an absolute phase Q1 that is periodic in the X direction corresponding to the direction of each of the optical axes 24A. As a result, an equiphase surface E1 that is inclined in the Z direction with respect to the XY plane is formed. Therefore, the incidence light $L_1$ is bent to be inclined in a direction perpendicular to the equiphase surface E1 and advances in a direction different from an advancing direction of the incidence light $L_1$. This way, the incidence light $L_1$ of the left circularly polarized light $P_L$ is converted into the transmitted light $L_2$ of the right circularly polarized light $P_R$ that is inclined by a predetermined angle with respect to the Z direction.

By changing the pitch P of the liquid crystal alignment pattern AP1 formed in the optically-anisotropic layer 23, the inclination of the transmitted light $L_2$ with respect to the Z direction can be changed. More specifically, as the pitch P of the liquid crystal alignment pattern AP1 decreases, light components transmitted through the rod-shaped liquid crystal compounds 24 adjacent to each other more strongly interfere with each other. Therefore, the transmitted light $L_2$ can be more largely bent.

In a case where the in-plane retardation value of the optically-anisotropic layer 23 is λ/4, in addition to the above-described transmitted light $L_2$, transmitted light $L_3$ of left circularly polarized light $P_L$ that is the same as the incidence light $L_1$ advances in the same direction as the advancing direction of the incidence light $L_1$ as indicated by a dotted line in FIG. 5.

Figure 6:
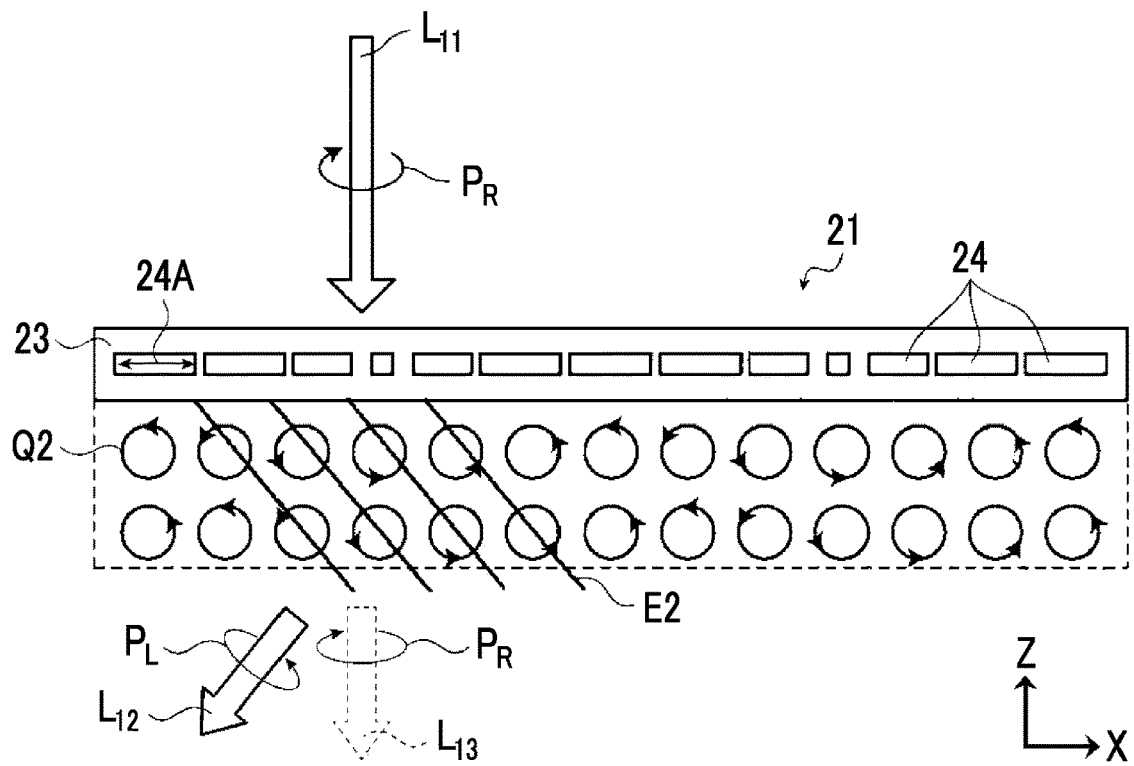
FIG. 6 is a diagram illustrating the behavior of transmitted light in a case where right circularly polarized light is incident into the optical element according to Embodiment 1 of the present invention.

In addition, as illustrated in FIG. 6, in a case where the in-plane retardation value of the optically-anisotropic layer 23 is λ/2 and incidence light $L_{11}$ of right circularly polarized light $P_R$ is incident into the optically-anisotropic layer 23 of the optical element 21, the incidence light $L_{11}$ transmits through the optically-anisotropic layer 23 to be imparted with a phase difference of 180° and is converted into transmitted light $L_{12}$ of left circularly polarized light $P_L$. In addition, in a case where the incidence light $L_{11}$ transmits through the optically-anisotropic layer 23, an absolute phase thereof changes depending on the direction of the optical axis 24A derived from each of the rod-shaped liquid crystal compounds 24. At this time, the optical axis 24A changes while rotating along the arrangement axis A. Therefore, a variation in the absolute phase of the incidence light $L_{11}$ varies depending on the direction of the optical axis 24A. Further, the liquid crystal alignment pattern AP1 that is formed in the optically-anisotropic layer 23 is a pattern that is periodic in the X direction. Therefore, as illustrated in FIG. 6, the incidence light $L_{11}$ transmitted through the optically-anisotropic layer 23 is imparted with an absolute phase Q2 that is periodic in the X direction corresponding to the direction of each of the optical axes 24A. As a result, an equiphase surface E2 that is inclined in the Z direction with respect to the XY plane is formed. Therefore, the incidence light $L_{11}$ is bent to be inclined in a direction perpendicular to the equiphase surface E2 and advances in a direction different from an advancing direction of the incidence light $L_{11}$. This way, the incidence light $L_{11}$ is converted into the transmitted light $L_{12}$ of the left circularly polarized light $P_L$ hat is inclined by a predetermined angle with respect to the Z direction.

In addition, in a case where light incident into the optically-anisotropic layer 23 is the incidence light $L_{11}$ of the right circularly polarized light $P_R$, as in the case where the incidence light $L_1$ of the left circularly polarized light $P_L$ is incident into the optically-anisotropic layer 23, as the pitch P of the liquid crystal alignment pattern AP1 decreases, the transmitted light $L_{12}$ can be more largely bent.

In a case where the in-plane retardation value of the optically-anisotropic layer 23 is $\lambda/4$, in addition to the above-described transmitted light $L_{12}$, transmitted light $L_{13}$ of right circularly polarized light $P_R$ that is the same as the incidence light $L_{11}$ advances in the same direction as the advancing direction of the incidence light $L_{11}$ as indicated by a dotted line in FIG. 6.

Figure 7:
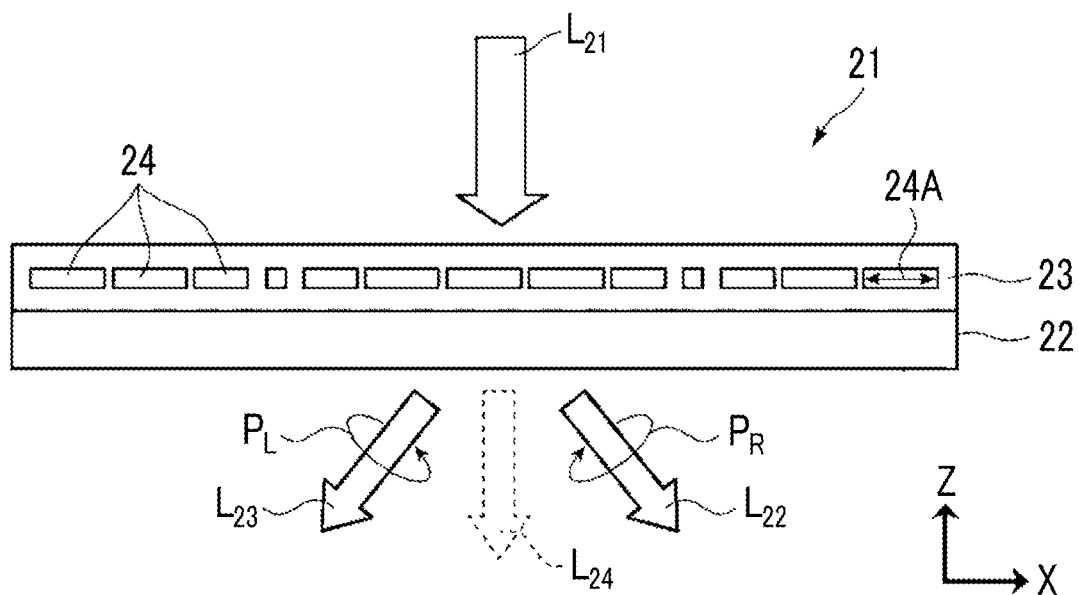
FIG. 7 is a diagram illustrating the behavior of transmitted light in a case where natural light is incident into the optical element according to Embodiment 1 of the present invention.

As illustrated in FIG. 7, in a case where the in-plane retardation value of the optically-anisotropic layer 23 is $\lambda/2$ and incidence light $L_{21}$ as natural light is incident into the optically-anisotropic layer 23 of the optical element 21, a left circularly polarized light component included in the incidence light $L_{21}$ is converted into transmitted light $L_{22}$ of right circularly polarized light $P_R$, and a right circularly polarized light component included in the incidence light $L_{21}$ is converted into transmitted light $L_{23}$ of left circularly polarized light $P_L$. This way, in a case where the incidence light $L_{21}$ as natural light is incident into the optically-anisotropic layer 23 of the optical element 21, the incidence light $L_{21}$ can be divided into the two transmitted light components $L_{22}$ and $L_{23}$ that advance in different directions.

In a case where the in-plane retardation value of the optically-anisotropic layer 23 is $\lambda/4$, in addition to the above-described transmitted light components $L_{22}$ and $L_{23}$, transmitted light $L_{24}$ of natural light that is the same as the incidence light $L_{21}$ advances in the same direction as an advancing direction of the incidence light $L_{21}$ as indicated by a dotted line in FIG. 7.

Figure 8:
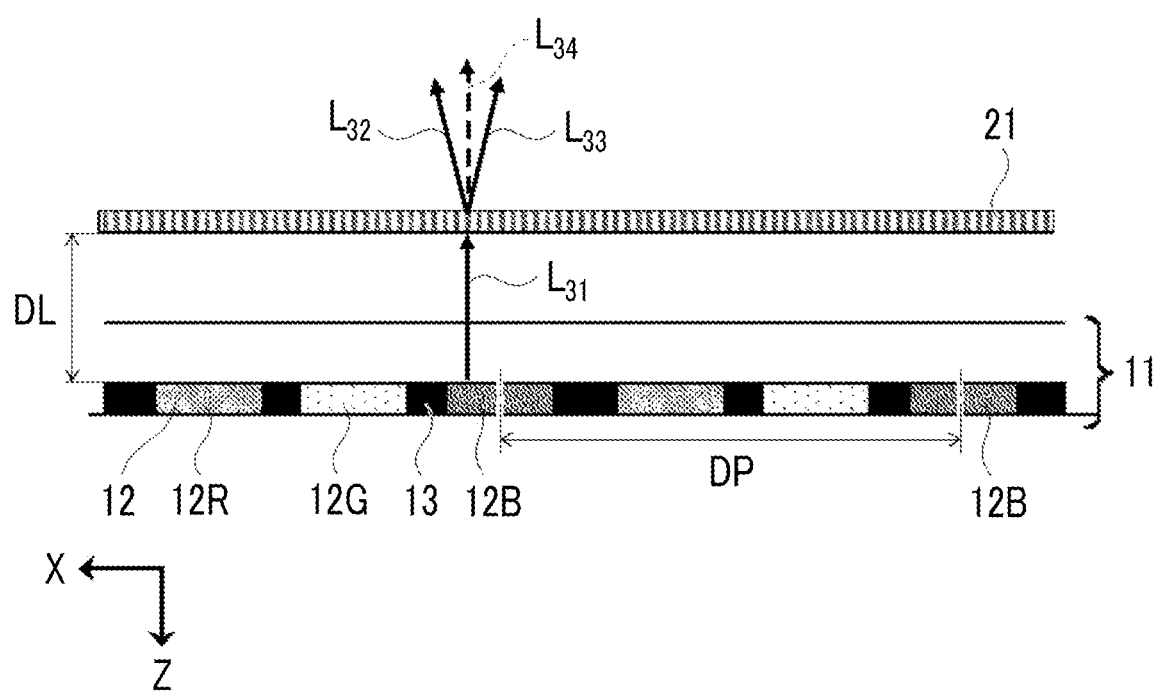
FIG. 8 is a partial side cross-sectional view illustrating the display panel and the optical element in a case where light is emitted from the display panel according to Embodiment 1 of the present invention into the optical element.

In a case where the optical element 21 is used in the wearable display device 1 according to Embodiment 1 and the in-plane retardation value of the optically-anisotropic layer 23 is $\lambda/4$, a left circularly polarized light component included in incidence light $L_{31}$ that is natural light incident from the display panel 11 through the blue pixel 12B as illustrated in FIG. 8 is converted into transmitted light $L_{32}$ of right circularly polarized light by the optical element 21, a right circularly polarized light component is converted into transmitted light $L_{33}$ of left circularly polarized light, and further transmitted light $L_{34}$ that advances in the same direction as an advancing direction of the incidence light $L_{31}$ is emitted from the optical element 21.

Each of the transmitted light components $L_{32}$ and $L_{33}$ advances in a direction different from that of the incidence light $L_{31}$. Therefore, as illustrated in FIG. 8, for example, the transmitted light $L_{33}$ is visually recognized by the user as if it was emitted through the pixel grid 13 adjacent to the blue pixel 12B that emits the incidence light $L_{31}$. As a result, in a case where an image displayed on the display panel 11 is enlarged by the eyepiece 31, the pixel grid 13 adjacent to the blue pixel 12B that emits the incidence light $L_{31}$ can be prevented from being visually recognized by the user. Further, incidence light components emitted through the plurality of pixels 12, for example, the plurality of red pixels 12R, the plurality of green pixels 12G, and the plurality of blue pixels 12B are also caused to advance in different directions by the optical element 21. As a result, in a case where an image displayed on the display panel 11 is enlarged by the eyepiece 31, the pixel grid 13 disposed between the plurality of pixels 12 can be prevented from being visually recognized by the user.

In addition, the optical element 21 can cause the transmitted light components $L_{32}$ and $L_{33}$ to advance in a state where it is bent by an angle determined depending on the pitch P of the liquid crystal alignment pattern AP1 of the optically-anisotropic layer 23. Therefore, by adjusting the pitch P of the liquid crystal alignment pattern AP1, the degree of bending of light transmitted through the optical element 21 can be adjusted, and the mixing of light components emitted from the display panel 11 through the plurality of different pixels 12 can be easily suppressed. As a result, in a case where an image displayed on the display panel 11 is visually recognized by the user of the wearable display device 1 according to Embodiment 1, the sharpness of the image can be maintained favorably.

Here, as illustrated in FIG. 8, a pixel pitch between the pixels 12 having the same color adjacent to each other in the display panel 11 will be referred to as "DP", and the distance between the pixel grid 13 and the optical element 21 of the display panel 11 will be referred to as "DL". In a case where the in-plane retardation value of the optically-anisotropic layer 23 is $\lambda/4$, it is preferable that the pitch P of the liquid crystal alignment pattern AP1 of the optically-anisotropic layer 23 satisfies the following expressions.

$$0.7\lambda/\sin(\arctan(DP/2DL)) \leq P \leq 1.6\lambda/\sin(\arctan(DP/2DL))$$

It is more preferable that the pitch P of the liquid crystal alignment pattern AP1 of the optically-anisotropic layer 23 satisfies the following expressions.

$$0.8\lambda/\sin(\arctan(DP/2DL)) \leq P \leq 1.3\lambda/\sin(\arctan(DP/2DL))$$

In a case where the in-plane retardation value of the optically-anisotropic layer 23 is $\lambda/2$, it is preferable that the pitch P of the liquid crystal alignment pattern AP1 of the optically-anisotropic layer 23 satisfies the following expressions.

$$0.7\lambda/\sin(\arctan(DP/4DL)) \leq P \leq 1.6\lambda/\sin(\arctan(DP/4DL))$$

It is more preferable that the pitch P of the liquid crystal alignment pattern AP1 of the optically-anisotropic layer 23 satisfies the following expressions.

$$0.8\lambda/\sin(\arctan(DP/2DL)) \leq P \leq 1.3\lambda/\sin(\arctan(DP/4DL))$$

Here, $\lambda$ represents a designed wavelength.

The pitch p of the liquid crystal alignment pattern AP1 of the optically-anisotropic layer 23 can be appropriately set depending on the pixel pitch DP between the pixels 12 having the same color adjacent to each other in the display panel 11 and the distance DL between the pixel grid 13 and the optical element 21 of the display panel 11.

As described above, in the wearable display device 1 according to Embodiment 1, in the optically-anisotropic layer 23 of the optical element 21, the optical axes 24A derived from the plurality of rod-shaped liquid crystal compounds 24 change while rotating along one direction in the XY plane. Therefore, circularly polarized light included in light emitted from the display panel 11 through the plurality of pixels 12 advances in a state where it is bent by transmitting through the optical element 21. Accordingly, in a case where an image displayed on the display panel 11 is enlarged by the eyepiece 31 when the user uses the wearable display device 1, the pixel grid 13 disposed between the plurality of pixels 12 in the display panel 11 can be prevented from being visually recognized by the user, and the sharpness of the image can be maintained favorably.

The wearable display device 1 according to Embodiment 1 may have any aspect as long as it includes the display panel 11, the optical element 21, and the eyepiece 31.

Examples of the wearable display device 1 include a head-mounted display, a head-up display, and an eyeglass type wearable display device.

In addition, in the optically-anisotropic layer 23 of the optical element 21, the in-plane retardation value of the plurality of regions R is a ¼ wavelength or a half wavelength with respect to the designed wavelength. However, as long as an in-plane retardation Re(550)=$\Delta n_{550} \times d$ of the plurality of regions R of the optically-anisotropic layer 23 with respect to the incidence light having a wavelength of 550 nm is in a range defined by the following Expression (1), the effects of the wearable display device 1 according to Embodiment 1 can be sufficiently obtained. Here, $\Delta n_{550}$ represents a difference in refractive index generated by refractive index anisotropy of the region R in a case where the wavelength of incidence light is 550 nm, and d represents the thickness of the optically-anisotropic layer 23.

$$50 \text{nm} \leq \Delta n_{550} \times d \leq 350 \text{nm} \tag{1}$$

That is, the in-plane retardation Re(550)=$\Delta n_{550} \times d$ of the plurality of regions R of the optically-anisotropic layer 23 satisfies Expression (1), a sufficient amount of a circularly polarized light component in light incident into the optically-anisotropic layer 23 can be converted into circularly polarized light that advances in a direction inclined with the Z direction. Therefore, the pixel grid 13 disposed between the plurality of pixels 12 in the display panel 11 can be prevented from being visually recognized by the user, and the sharpness of the image can be maintained favorably.

Further, it is preferable that an in-plane retardation Re(450)=$\Delta n_{450} \times d$ of each of the plurality of regions R of the optically-anisotropic layer 23 with respect to incidence light having a wavelength of 450 nm and an in-plane retardation Re(550)=$\Delta n_{550} \times d$ of each of the plurality of regions R of the optically-anisotropic layer 23 with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.00 \tag{2}$$

Expression (2) represents that the rod-shaped liquid crystal compound 24 included in the optically-anisotropic layer 23 has reverse dispersibility. That is, by satisfying Expression (2), the optically-anisotropic layer 23 can correspond to incidence light having a wide range of wavelength. Therefore, the pixel grid 13 can be more effectively prevented from being visually recognized by the user.

In addition, in order to more effectively prevent the pixel grid 13 from being visually recognized by the user, the direction in which the optical axes 24A of the plurality of rod-shaped liquid crystal compounds 24 in the optically-anisotropic layer 23 of the optical element 21 change while continuously rotating, that is, the direction of the arrangement axis A is parallel to a direction in which the plurality of pixels 12 are arranged. As a result, circularly polarized light components in light emitted through the plurality of pixels 12 of the display panel 11 can be matched to a direction in which the light is bent by the optical element 21 and a direction in which the plurality of pixels 12 and the pixel grid 13 are arranged. Therefore, the pixel grid 13 can be more effectively prevented from being visually recognized by the user.

In addition, in order to prevent moire from being visually recognized by the user, the direction in which the optical axes 24A of the plurality of rod-shaped liquid crystal compounds 24 in the optically-anisotropic layer 23 of the optical element 21 change while continuously rotating, that is, the direction of the arrangement axis A is inclined with respect to the direction in which the plurality of pixels 12 are arranged.

In addition, the plurality of pixels 12 of the display panel 11 include the red pixels 12R, the green pixels 12G, and the blue pixels 12B. Light components emitted from the display panel 11 through the three kinds of pixels 12R, 12G, and 12B have different brightness values. For example, light emitted from the display panel 11 through the green pixels 12G has higher brightness than light emitted from the display panel 11 through the red pixels 12R and the blue pixels 12B and looks white. In this case, although not illustrated in the drawing, a circularly polarizing plate corresponding to each of the pixels 12R, 12G, and 12B can be disposed between the display panel 11 and the optical element 21. As a result, by converting light incident into the red pixels 12R, the green pixels 12G, and the blue pixels 12B into any one of right circularly polarized light or left circularly polarized light in advance using the circularly polarizing plate, directions in which red light, green light, and blue light incident into the optical element 21 are bent can be determined Therefore, by adjusting the directions in which red light, green light, and blue light are bent, the brightness of light emitted through the red pixels 12R, the green pixels 12G, and the blue pixels 12B can be made uniform.

In addition, although not illustrated in the drawing, examples of a method of making the brightness of light emitted through the red pixels 12R, the green pixels 12G, and the blue pixels 12B uniform include a method of changing the pitch P of the liquid crystal alignment pattern AP1 of the optically-anisotropic layer 23 per each of the pixels 12R, 12G, and 12B to adjust the degree of bending of light in the optically-anisotropic layer 23. In this case, the pixel P of the liquid crystal alignment pattern AP1 in the optically-anisotropic layer 23 disposed on the corresponding pixel can be reduced with respect to a light component of which the degree of bending is desired to be increased among light components emitted through the red pixels 12R, the green pixels 12G, and the blue pixels 12B. In addition, the pitch P of the liquid crystal alignment pattern AP1 in the optically-anisotropic layer 23 disposed on the corresponding pixel can be increased with respect to a light component of which the degree of bending is desired to be reduced. As a result, for example, the degree of mixing of the light components emitted through the red pixels 12R, the green pixels 12G, and the blue pixels 12B can be adjusted. Therefore, the brightness values of the light components emitted through the red pixels 12R, the green pixels 12G, and the blue pixels 12B can be made uniform.

Here, in a case where the plurality of pixels 12 of the display panel 11 includes the red pixels 12R, the green pixels 12G, and the blue pixels 12B, it is preferable that an average pitch Ph(R) of the liquid crystal alignment pattern AP1 in the optically-anisotropic layer 23 disposed on the red pixels 12R, an average pitch Ph(G) of the liquid crystal alignment pattern AP1 in the optically-anisotropic layer 23 disposed on the green pixels 12G, and an average pitch Ph(B) of the liquid crystal alignment pattern AP1 in the optically-anisotropic layer 23 disposed on the blue pixels 12B satisfy the following Expression (3).

$$Ph(B) < Ph(G) < Ph(R) \tag{3}$$

By satisfying Expression (3), the brightness values of the light components emitted through the red pixels 12R, the green pixels 12G, and the blue pixels 12B can be made uniform.

Embodiment 2

Figure 9:
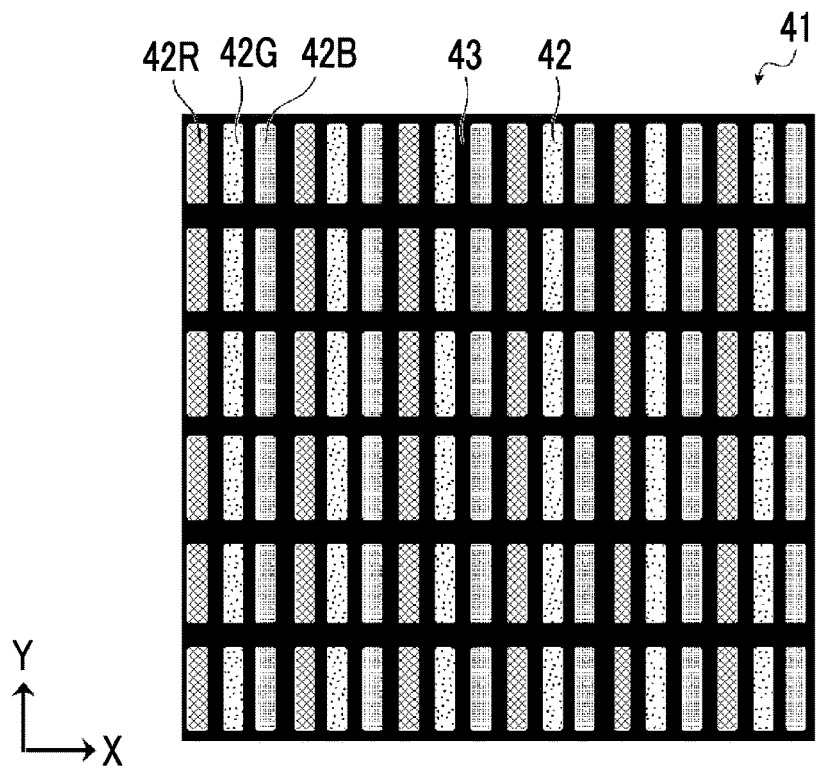
FIG. 9 is a partial plan view illustrating a display panel according to Embodiment 2 of the present invention.
Figure 10:
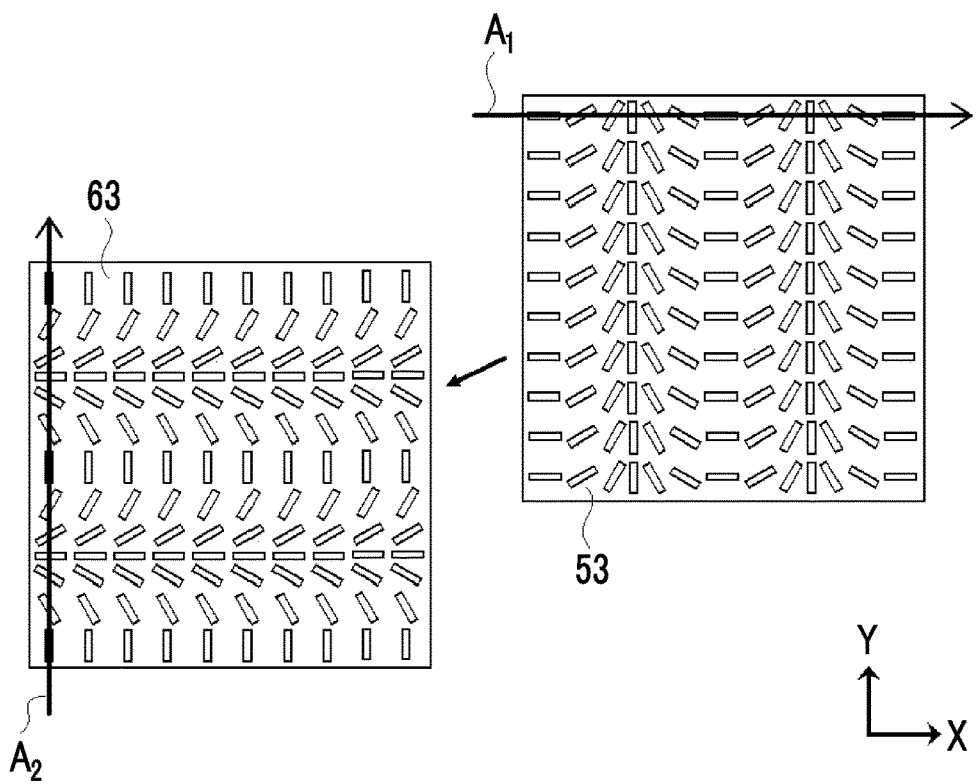
FIG. 10 is a partially exploded plan view illustrating an optical element according to Embodiment 2 of the present invention.

FIG. 9 is a plan view illustrating a display panel 41 according to Embodiment 2. As illustrated in FIG. 9, the display panel 41 according to Embodiment 2 includes: a plurality of pixels 42 that are arranged in the X direction and the Y direction; and a pixel grid 43 that is disposed between the plurality of pixels 42 in a grid shape. In addition, the plurality of pixels 42 includes a plurality of red pixels 42R, a plurality of green pixels 42G, and a plurality of blue pixels 42B. In the wearable display device including the display panel 41, in order to prevent the pixel grid 43 from being visually recognized by the user, for example, as illustrated in FIG. 10, an optical element in which a first optically-anisotropic layer 53 and a second optically-anisotropic layer 63 having the same configuration as the optically-anisotropic layer 23 of the optical element 21 according to Embodiment 1 are laminated to be rotated from each other by 90° may be used. In FIG. 10, an arrangement axis $A_1$ in the first optically-anisotropic layer 53 is aligned in the X direction, and an arrangement axis $A_2$ in the second optically-anisotropic layer 63 is aligned in the Y direction. In the following description, for convenience of description, the first optically-anisotropic layer 53 is disposed on the display panel 41 side further than the second optically-anisotropic layer 63.

Figure 11:
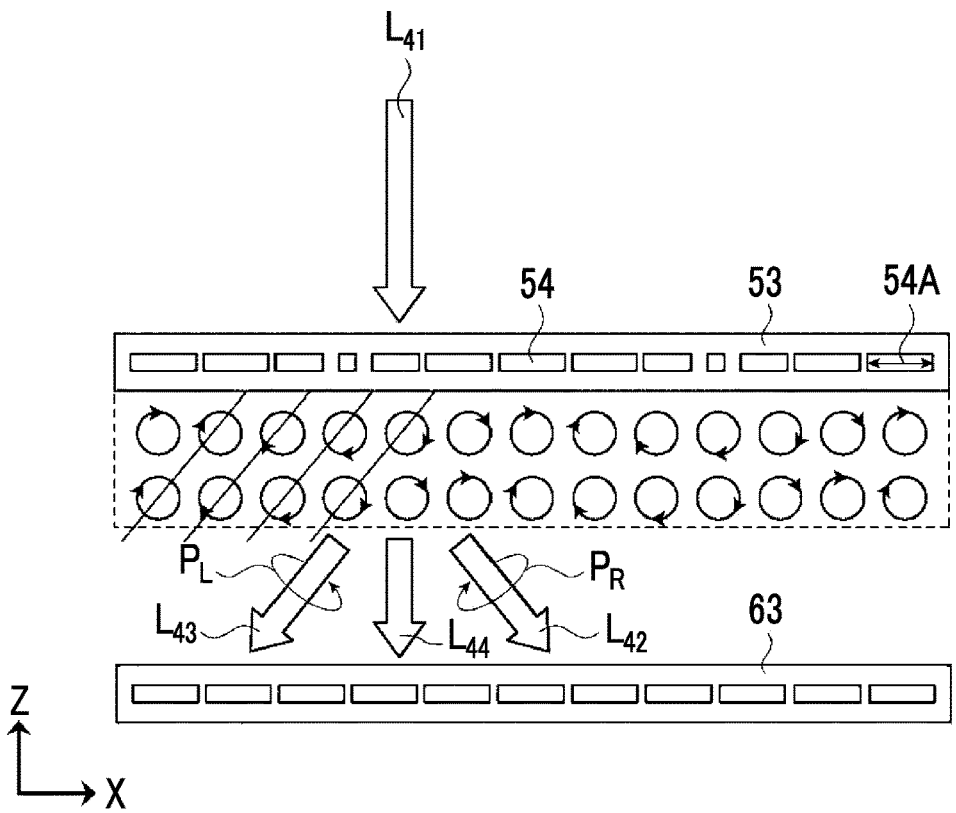
FIG. 11 is a diagram illustrating the behavior of transmitted light in a case where natural light is incident into a first optically-anisotropic layer of the optical element according to Embodiment 2 of the present invention.
Figure 12:
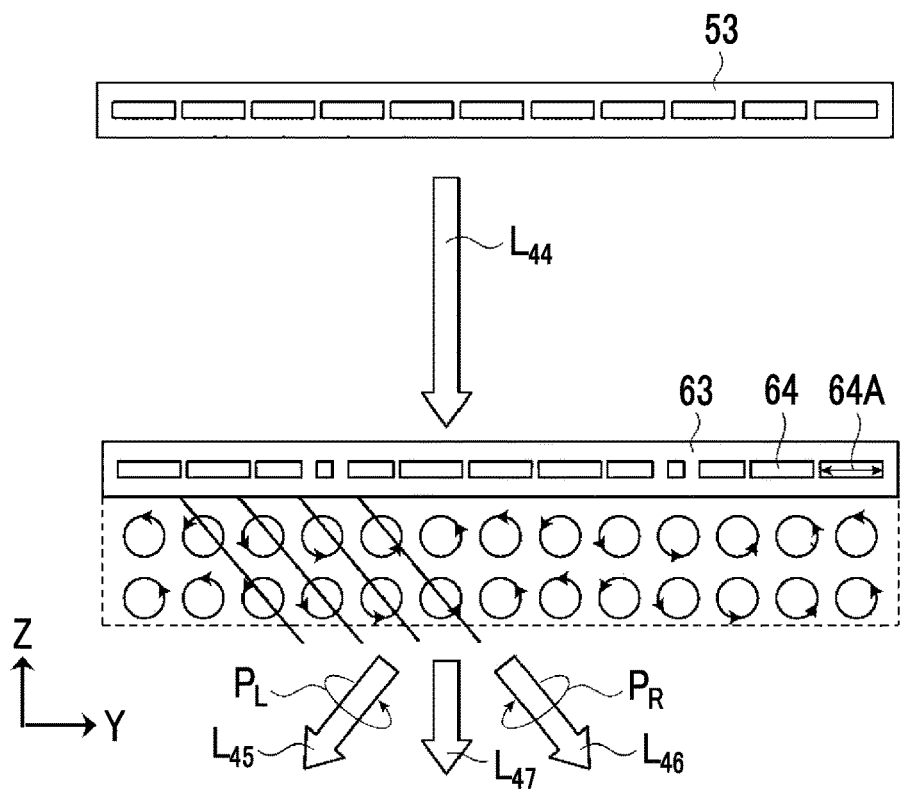
FIG. 12 is a diagram illustrating the behavior of transmitted light in a case where transmitted light of the first optically-anisotropic layer is incident into a second optically-anisotropic layer of the optical element according to Embodiment 2 of the present invention.

In a case where light is incident into the optical element including the two optically-anisotropic layers 53 and 63, the behavior of transmitted light will be described. FIG. 11 is a partial cross-sectional view obtained by cutting the first optically-anisotropic layer 53 and the second optically-anisotropic layer 63 according to Embodiment 2 along a surface parallel to an XZ plane. In addition, FIG. 12 is a partial cross-sectional view obtained by cutting the first optically-anisotropic layer 53 and the second optically-anisotropic layer 63 according to Embodiment 2 along a surface parallel to a YZ plane.

As illustrated in FIG. 11, in a case where the in-plane retardation value of the optically-anisotropic layer 53 is λ/4 and, for example, incidence light $L_{41}$ as natural light is incident into the optically-anisotropic layer 53, as in the optically-anisotropic layer 23 according to Embodiment 1, a left circularly polarized light component included in the incidence light $L_{41}$ is converted into transmitted light $L_{42}$ of right circularly polarized light $P_R$ by the first optically-anisotropic layer 53, a right circularly polarized light component included in the incidence light $L_{41}$ is converted into transmitted light $L_{43}$ of left circularly polarized light $P_L$, and further transmitted light $L_{44}$ that advances in the same direction as an advancing direction of the incidence light $L_{41}$ is emitted from the first optically-anisotropic layer 53. Optical axes 54A of the plurality of rod-shaped liquid crystal compounds 54 of the first optically-anisotropic layer 53 change while rotating along the X direction. Therefore, the transmitted light $L_{42}$ and the transmitted light $L_{43}$ advance in a state where they are bent to be inclined in the X direction. Further, in a case where the in-plane retardation value of the second optically-anisotropic layer 63 is λ/4 and the transmitted light $L_{44}$ that advances in the same direction as that of the incidence light $L_{41}$ is incident into the second optically-anisotropic layer 63, as illustrated in FIG. 12, the transmitted light $L_{44}$ is converted into transmitted light $L_{45}$ of right circularly polarized light $P_R$ and transmitted light $L_{46}$ of left circularly polarized light $P_L$, and further transmitted light $L_{47}$ that advances in the same direction as an advancing direction of the transmitted light $L_{44}$ is emitted from the second optically-anisotropic layer 63. Optical axes 64A of the plurality of rod-shaped liquid crystal compounds 64 of the second optically-anisotropic layer 63 change while rotating along the Y direction. Therefore, the transmitted light $L_{45}$ and the transmitted light $L_{46}$ advance in a state where they are bent to be inclined in the Y direction.

In addition, although not illustrated in the drawing, the transmitted light $L_{42}$ of right circularly polarized light $P_R$ emitted from the first optically-anisotropic layer 53 is converted into transmitted light of left circularly polarized light by transmitting through the second optically-anisotropic layer 63 and advances in a state where it is bent to be further inclined in the Y direction. In addition, the transmitted light $L_{43}$ of left circularly polarized light $P_L$ emitted from the first optically-anisotropic layer 53 is also converted into transmitted light of right circularly polarized light and advances in a state where it is bent to be further inclined in the Y direction.

Although not illustrated in the drawing, in a case where the in-plane retardation values of the first optically-anisotropic layer 53 and the second optically-anisotropic layer 63 are λ/2 and incidence light as natural light is incident into the first optically-anisotropic layer 53, first, a right circularly polarized light component included in the incidence light is converted into transmitted light of left circularly polarized light by the first optically-anisotropic layer 53, and a left circularly polarized light component included in the incidence light is converted into transmitted light of right circularly polarized light. These transmitted light components advance in a state where they are bent in directions opposite to each other to be inclined in the X direction. In addition, as in the case where the in-plane retardation value of the second optically-anisotropic layer 63 is λ/4, the transmitted light of right circularly polarized light and the transmitted light of left circularly polarized light emitted from the first optically-anisotropic layer 53 are converted into transmitted light of left circularly polarized light and transmitted light of right circularly polarized light, respectively, and advance in a state where they are bent to be further inclined in the Y direction.

As described above, by using the optical element including the first optically-anisotropic layer 53 and the second optically-anisotropic layer 63 in the wearable display device, circularly polarized light components of light emitted through the plurality of pixels 42 of the display panel 41 can be caused to advance in a state where they are bent both in the X direction and the Y direction. Therefore, the pixel grid 43 having a grid shape disposed in the X direction and the Y direction can be prevented from being visually recognized by the user.

The number of optically-anisotropic layers having the same configuration as the optically-anisotropic layer 23 according to Embodiment 1 can be changed depending on the shape of the pixel grid of the display panel. At this time, the rotation angles of the plurality of optically-anisotropic layer in the XY plane can be appropriately changed. For example, although not illustrated in the drawing, in a case where the pixel grid included in the display panel has a hexagonal grid shape and a plurality of pixels are arranged in gaps of the pixel grid, three optically-anisotropic layers can be combined to be rotated from each other at the same rotation direction of 60° in the XY plane. As a result, a direction in which optical axes of a plurality of rod-shaped liquid crystal compounds of each of the optically-anisotropic layers change while rotating can be made to be parallel to a direction in which the plurality of pixels are arranged. Therefore, in a case where the user uses the wearable display device, the pixel grid can be effectively prevented from being visually recognized by the user.

Embodiment 3

Figure 13:
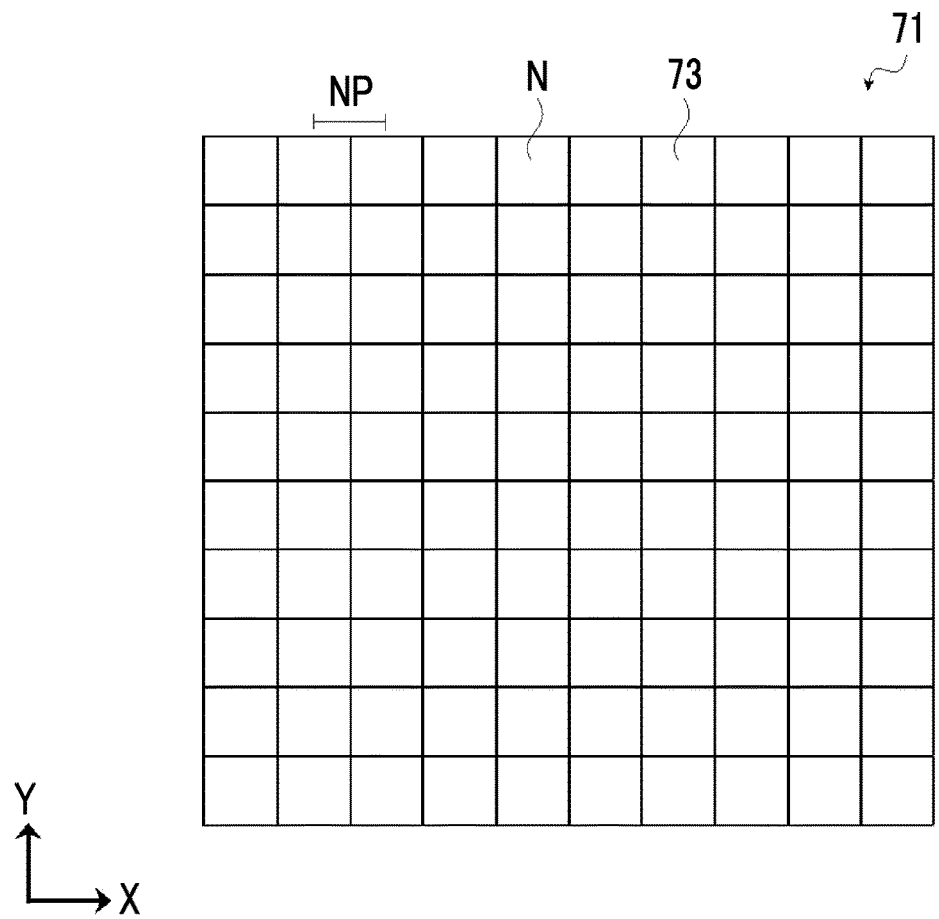
FIG. 13 is a partial plan view illustrating an optical element according to Embodiment 3 of the present invention.
Figure 14:
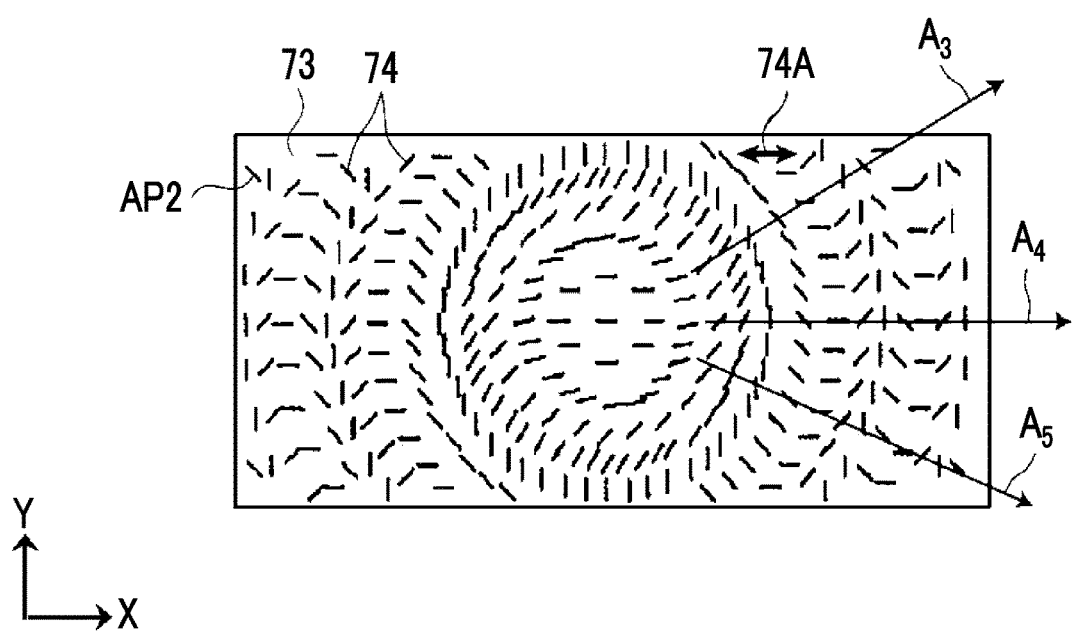
FIG. 14 is a diagram illustrating a liquid crystal alignment pattern according to Embodiment 3 of the present invention.

FIG. 13 is a partial plan view illustrating an optical element 71 according to Embodiment 3. An optically-anisotropic layer 73 of the optical element 71 according to Embodiment 3 includes a plurality of optical components N arranged in the X direction and the Y direction. As illustrated in FIG. 14, the plurality of optical components N includes a plurality of rod-shaped liquid crystal compounds 74, and optical axes 74A of the plurality of rod-shaped liquid crystal compounds 74 form a liquid crystal alignment pattern AP2 illustrated in FIG. 14 in each of the optical components N. In the liquid crystal alignment pattern AP2 according to Embodiment 3, the direction of the optical axes 74A of the rod-shaped liquid crystal compounds 74 changes while gradually rotating along multiple directions from the center of the liquid crystal alignment pattern AP2 to the outside, for example, along arrangement axes $A_3$, $A_4$, $A_5$, . . . , and the like. Absolute phases of circularly polarized light components transmitted through the optical components N having the liquid crystal alignment pattern AP2 change in individual local regions where the directions of the optical axes 74A of the rod-shaped liquid crystal compounds 74 are different. At this time, variations in the respective absolute phases vary depending on the directions of the optical axes 74A of the rod-shaped liquid crystal compounds 74 through which the circularly polarized light components have transmitted.

In a case where the liquid crystal alignment pattern in which the optical axes radially change while rotating is provided, a circularly polarized light component of light incident into the optically-anisotropic layer 73 can be caused to transmit through the optically-anisotropic layer 73 as diverging light and converging light. That is, functions as a convex lens and a concave lens can be implemented by the liquid crystal alignment pattern AP2 in the optically-anisotropic layer 73. That is, the circularly polarized light component transmits through the optical component N of the optical element 71 according to Embodiment 3 such that the circularly polarized light transmitted through the optical component N can be caused to advance in a state where it is bent to be inclined in all the directions in the XY plane. Therefore, by using the optical element 71 according to Embodiment 3 in the wearable display device, the pixel grid can be prevented from being visually recognized by the user even in a case where the pixel grid of the display panel has any shape.

Here, as illustrated in FIG. 13, a pitch between optical components N adjacent to each other will be referred to as "arrangement pitch NP". It is preferable that the arrangement pitch NP of the optical components is matched to the pixel pitch of the display panel (not illustrated). Although not illustrated in the drawing, in a case where the pixel pitch of the display panel is represented by DP, the arrangement pitch NP of the optical components N is preferably 0.7 DP to 1.3 DP and more preferably 0.8 DP to 1.2 DP.

The distance between the pixel grid and the optical element 73 of the display panel will be referred to as "DL". In a case where the in-plane retardation value of the optically-anisotropic layer 73 is $\lambda/4$, it is preferable that an average pitch P2 of the liquid crystal alignment pattern AP2 at a point (point in the same optical component N) at a distance of x from the in-plane center of the optical component N satisfies the following Expression.

$$0.7\lambda/\sin(\arctan(x/DL)) \leq P2 \leq 1.6\lambda/\sin(\arctan(x/DL))$$

It is more preferable that average pitch P2 of the liquid crystal alignment pattern AP2 satisfies the following expression.

$$0.8\lambda/\sin(\arctan(x/DL)) \leq P2 \leq 1.3\lambda/\sin(\arctan(x/DL))$$

In a case where the in-plane retardation value of the optically-anisotropic layer 73 is $\lambda/2$, it is preferable that the average pitch P2 of the liquid crystal alignment pattern AP2 satisfies the following Expression.

$$0.7\lambda/\sin(\arctan(x/2DL)) \leq P2 \leq 1.6\lambda/\sin(\arctan(x/2DL))$$

In a case where the in-plane retardation value of the optically-anisotropic layer 73 is $\lambda/2$, it is more preferable that the average pitch P2 of the liquid crystal alignment pattern AP2 satisfies the following Expression.

$$0.8\lambda/\sin(\arctan(x/2DL)) \leq P2 \leq 1.3\lambda/\sin(\arctan(x/2DL))$$

Here, $\lambda$ represents a designed wavelength.

The pitch P2 of the liquid crystal alignment pattern AP2 of the optically-anisotropic layer 73 can be appropriately set depending on the pixel pitch DP of the display panel and the distance between the pixel grid and the optical element 73 in the display panel.

Embodiment 4

The optically-anisotropic layers 23, 53, 63, and 73 according to Embodiments 1 to 3 include the rod-shaped liquid crystal compounds 24, 54, 64, and 74, respectively. The optically-anisotropic layer according to the present invention may include disk-shaped liquid crystal compounds instead of the rod-shaped liquid crystal compounds.

Figure 15:
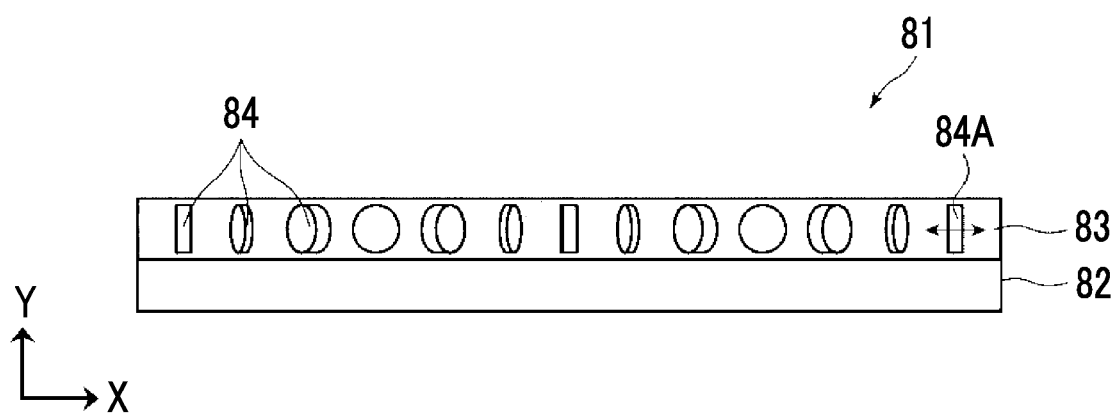
FIG. 15 is a partial side cross-sectional view illustrating an optical element according to Embodiment 4 of the present invention.

FIG. 15 is a side cross-sectional view illustrating a configuration of an optical element 81 according to Embodiment 4. As illustrated in FIG. 15, the optical element 81 according to Embodiment 4 has the same configuration as the optical element 21 according to Embodiment 1, except that an optically-anisotropic layer includes disk-shaped liquid crystal compounds 84. That is, the optical element 81 according to Embodiment 4 includes a substrate 82 and an optically-anisotropic layer 83 formed on the substrate 82. The optically-anisotropic layer 83 includes a plurality of disk-shaped liquid crystal compounds 84.

Each of the plurality of disk-shaped liquid crystal compounds 84 included in the optically-anisotropic layer 83 rises in the Z direction, and an optical axis 84A of the disk-shaped liquid crystal compound 84 is defined as an axis perpendicular to a disk plane, that is, a so-called fast axis.

Figure 16:
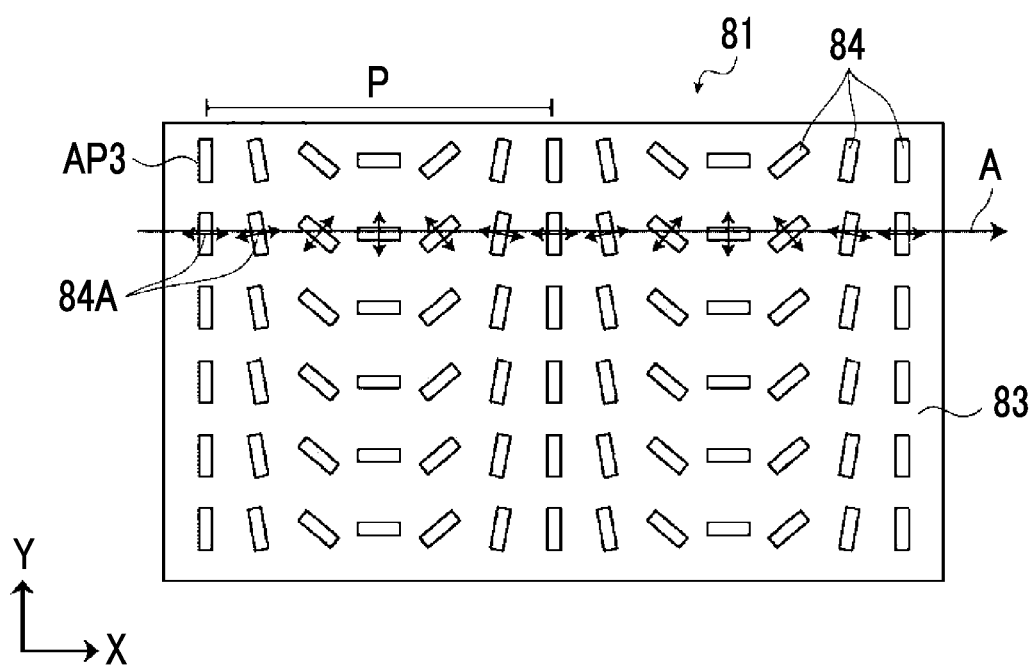
FIG. 16 is a partial plan view illustrating the optical element according to Embodiment 4 of the present invention.

FIG. 16 is a partial plan view illustrating the optical element 81 according to Embodiment 4. As illustrated in FIG. 16, the optical axis 84A of the disk-shaped liquid crystal compound 84 changes while continuously rotating along the arrangement axis A. That is, an angle between the arrangement axis and the optical axis 84A of the disk-shaped liquid crystal compound 84 gradually changes along the arrangement axis A. As a result, a liquid crystal alignment pattern AP3 having a pitch P is formed in the optically-anisotropic layer 83 according to Embodiment 4 as in the optically-anisotropic layer 23 according to Embodiment 1.

Therefore, the optical element 81 according to Embodiment 4 has the same function as that of the optical element 21 according to Embodiment 1. That is, although not illustrated in the drawing, a circularly polarized light component in light incident into the optically-anisotropic layer 83 of the optical element 81 can be caused to advance in a state where it is bent to be inclined in a direction different from the incidence direction, and the pixel grid (not illustrated) can be prevented from being visually recognized by the user.

Hereinafter, the details of the optical element according to the present invention will be described.

<Support>

As the support, a transparent support is preferable, and examples thereof include a polyacrylic resin film such as polymethyl methacrylate, a cellulose resin film such as cellulose triacetate, and a cycloolefin polymer film (for example, trade name "ARTON", manufactured by JSR Corporation; or trade name "ZEONOR", manufactured by Zeon Corporation). The support is not limited to a flexible film and may be a non-flexible substrate such as a glass substrate.

<Optically-Anisotropic Layer>

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above. By forming an alignment film on the support, applying the liquid crystal composition to the alignment film, and curing the applied liquid crystal composition, the optically-anisotropic layer formed of the cured layer of the liquid crystal composition can be obtained. Although the optically-anisotropic layer functions as a so-called λ/4 plate or λ/2 plate, the present invention also includes an aspect where a laminate including the support and the alignment film that are integrated functions as a so-called λ/4 plate or λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, or an alignment assistant.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a torsion component to liquid crystals or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

-Rod-Shaped Liquid Crystal Compound-

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem. (1989), Vol. 190, p. 2255, Advanced Materials (1993), Vol. 5, p. 107, U.S. Pat. No. 4,683,327A, U.S. Pat. No. 5,622,648A, U.S. Pat. No. 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627A. Further, as the rod-shaped liquid crystal compound, for example, compounds described in JP1999-513019A (JP-H11-513019A) and JP2007-279688A can be preferably used.

-Disk-Shaped Liquid Crystal Compound-

As the disk-shaped liquid crystal compound, for example, compounds described in JP2007-108732A and JP2010-244038A can be preferably used.

<Alignment Film for Forming Optically-Anisotropic Layer>

Examples of the alignment film for forming the optically-anisotropic layer include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, or methyl stearate.

As the alignment film, a film obtained by rubbing a surface of a polymer layer can be used. The rubbing treatment is performed by rubbing a surface of a polymer layer with paper or fabric in a given direction multiple times. As the kind of the polymer used for the alignment layer, for example, polyimide, polyvinyl alcohol, a polymer having a polymerizable group described in JP1997-152509A (JP-H9-152509A), or a vertical alignment film such as JP2005-097377A, JP2005-099228A, and JP2005-128503A can be preferably used. The vertical alignment film described in the present invention refers to an alignment film in which a major axis of a molecule of the polymerizable rod-shaped liquid crystal compound according to the present invention is aligned to be substantially perpendicular to a rubbing direction of the vertical alignment film. The thickness of the alignment layer is not necessarily large as long as it can provide the alignment function, and is preferably 0.01 to 5 μm and more preferably 0.05 to 2 μm.

In addition, a so-called photo-alignment film obtained by irradiating a photo-alignable material with polarized light or non-polarized light can also be used. That is, the photo-alignment film may be prepared by applying the photo-alignable material to the support. The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenylsubstituted nadiimide compound having a photo-alignable unit described in JP2002-265541A and JP2002-317013A; a photocrosslinking silane derivative described in JP4205195B and JP4205198B, a photocrosslking polyimide, polyamide, or ester described in JP2003-520878A, JP2004-529220A, and JP4162850B; and a photodimerizable compound, in particular, a cinnamate (cinnamic acid) compound, a chalcone compound, or a phosphorus compound described in JP1997-118717A (JP-H9-118717A), JP1998-506420A (JP-H10-506420A), JP2003-505561A, WO2010/150748A, JP2013-177561A, and JP2014-012823A. Among these, an azo compound, a photocrosslinking polyimide, polyamide, ester, a cinnamate compound, or a chalcone compound is more preferable.

In the present invention, the photo-alignment film is preferably used.

Figure 17:
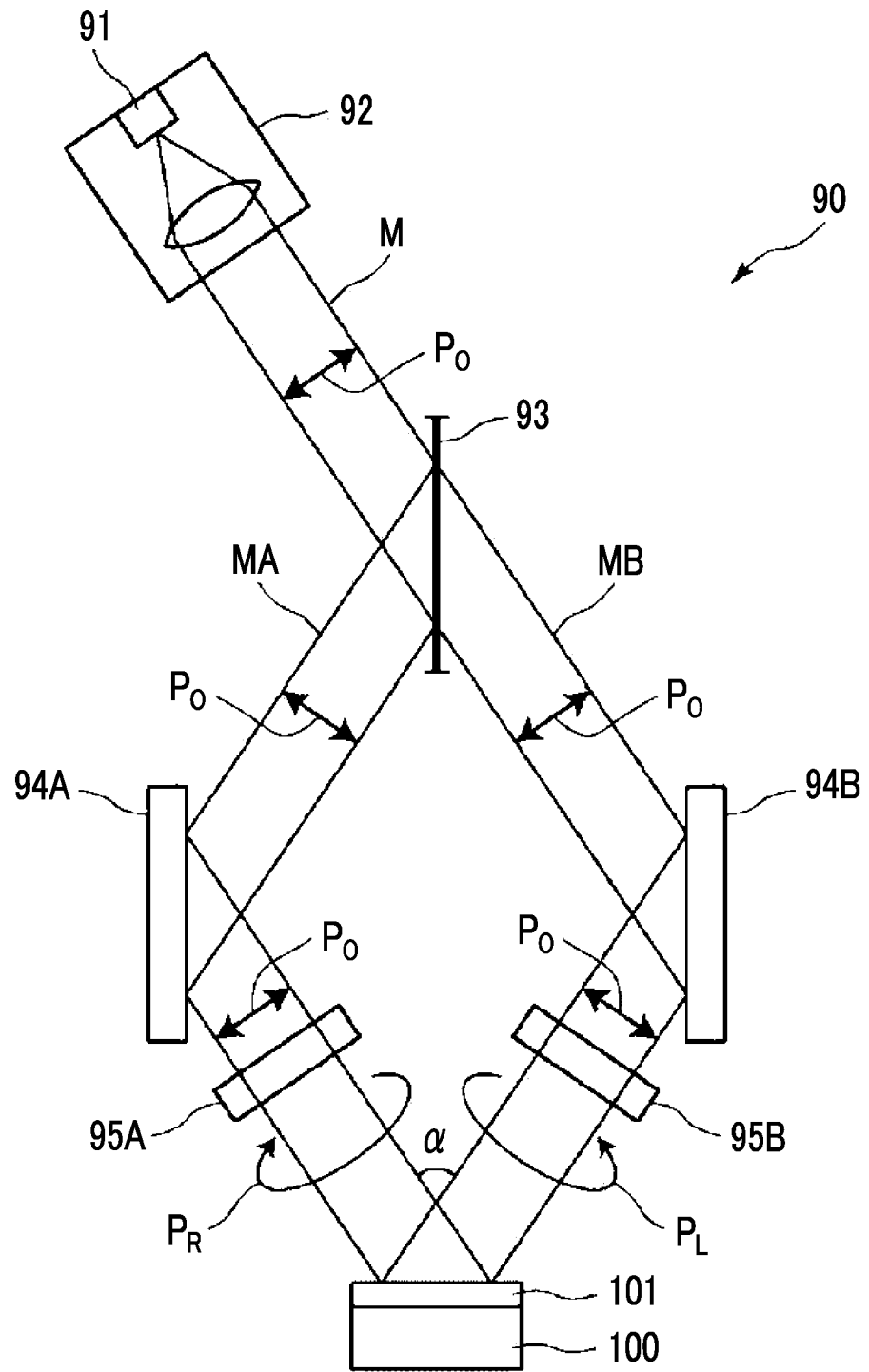
FIG. 17 is a diagram illustrating a schematic configuration of an exposure device that irradiates an alignment film with interference light.

The alignment film is applied to the support, is dried, and is exposed to laser to form the alignment film. FIG. 17 is a schematic diagram illustrating an exposure device for the alignment film. An exposure device 90 includes: a light source 92 including a semiconductor laser 91; a beam splitter 93 that splits laser light M emitted from the semiconductor laser 91 into two beams MA and MB; mirrors 94A and 94B that are disposed on optical paths of the split two beams MA and MB; and λ/4 plates 95A and 95B. The λ/4 plates 95A and 95B have optic axes perpendicular to each other, the λ/4 plate 95A converts linearly polarized light $P_O$ into right circularly polarized light $P_R$, and the λ/4 plate 95B converts linearly polarized light Po into left circularly polarized light $P_L$.

A support 100 including an alignment film 101 is disposed at an exposed portion, the two beams MA and MB intersect and interfere each other on the alignment film 101, and the alignment film 101 is irradiated with and exposed to the interference light. Due to the interference at this time, the polarization state of light with which the alignment film 101 is irradiated periodically changes according to interference fringes. As a result, in the alignment film 101, an alignment pattern in which the alignment state periodically changes can be obtained. In the exposure device 90, by changing an intersection angle α between the two beams MA and MB, the pitch of the alignment pattern can be changed. By forming the optically-anisotropic layer on the alignment film having the pattern in which the alignment state periodically changes, the optically-anisotropic layer having the liquid crystal alignment pattern corresponding to the period can be formed.

Figure 18:
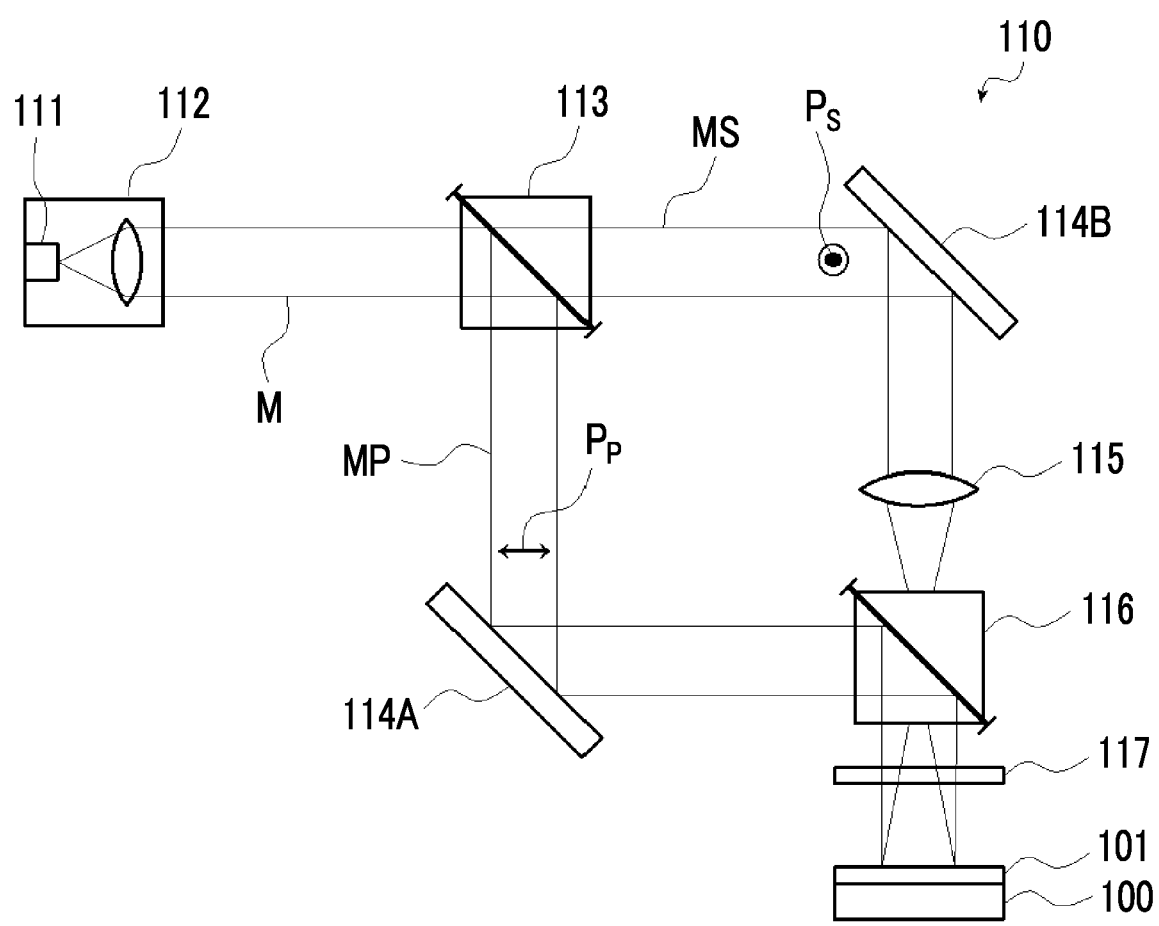
FIG. 18 is a diagram illustrating a schematic configuration of another exposure device that irradiates an alignment film with interference light.

In addition, in a case where the alignment film is exposed to laser, an exposure device 110 illustrated in FIG. 18 can also be used. The exposure device 110 includes: a light source 112 including a semiconductor laser 111; a first polarization beam splitter 113 that splits laser light M emitted from the semiconductor laser into two beams MP and MS; mirrors 114A and 114B that are disposed on optical paths of the split two beams MP and MS; a lens 115 that is disposed on the optical path of the beam MS; a second polarization beam splitter 116; and a λ/4 plate 117. Among the beams split from the laser light M by the first polarization beam splitter 113, the beam MP is a beam of P polarized light $P_P$, and the beam MS is a beam of S polarized light $P_S$. In addition, although not illustrated in the drawing, the P polarized light MP and the S polarized light MS incident into the λ/4 plate 117 are converted into circularly polarized light components rotating in directions opposite to each other.

The support 100 including the alignment film 101 is disposed at an exposed portion, the two beams emitted from the λ/4 plate 117 intersect and interfere each other on the alignment film 101, and the alignment film 101 is irradiated with and exposed to the interference light. At this time, as in the exposure device 90 illustrated in FIG. 17, the polarization state of light with which the alignment film 101 is irradiated periodically changes according to interference fringes. As a result, in the alignment film 101, an alignment pattern in which the alignment state periodically changes can be obtained. In the exposure device 110, by changing an F number of the lens 115 (a ratio between a focal length and an effective aperture of the lens 115), the focal length of the lens 115, and the distance between the lens 115 and the alignment film 101, the pitch of the alignment pattern can be changed.

<Formation of Optically-Anisotropic Layer>

The optically-anisotropic layer may be formed by applying multiple layers of the liquid crystal composition to the alignment film. The application of the multiple layers refers to repetition of the following processes including: preparing a first liquid crystal immobilized layer by applying the liquid crystal composition to the alignment film, heating the liquid crystal composition, cooling the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet light for curing as described above. Even in a case where the optically-anisotropic layer is formed by the application of the multiple layers such that the total thickness of the optically-anisotropic layer is large, the alignment direction of the alignment film can be reflected from a lower surface of the optically-anisotropic layer to an upper surface thereof.

By bonding the support and the optically-anisotropic layer obtained as described above using an adhesive layer, an optical element in which the support and the optically-anisotropic layer are laminated can be obtained.

Examples of a pressure sensitive adhesive used for the adhesive layer include a resin such as a polyester resin, an epoxy resin, a polyurethane resin, a silicone resin, or an acrylic resin. Among these examples, one kind alone or a mixture of two or more kinds may be used. In particular, an acrylic resin is preferable from the viewpoints that, for example, reliability such as water fastness, heat resistance, or light fastness is excellent, adhesion force or transparency is excellent, and the refractive index is easily adjustable to be suitable for a liquid crystal display.

EXAMPLES

Examples and Comparative Examples of the optical element according to the present invention will be described.

Example 1

An optically-anisotropic layer was formed on a support to prepare an optical element.
[Preparation of Optically-Anisotropic Layer]
(Saponification of Support)

As the support, a commercially available triacetyl cellulose film "Z-TAC" (manufactured by Fuji Film Co., Ltd.) was used. The support was caused to pass through an induction heating roll at a temperature of 60° C. such that the support surface temperature was increased to 40° C. Next, an alkali solution shown below was applied to a single surface of the support using a bar coater in an application amount of 14 mL/m$^2$, the support was heated to 110° C., and the support was transported for 10 seconds under a steam infrared electric heater (manufactured by Noritake Co., Ltd.). Next, 3 mL/m$^2$ of pure water was applied to the support surface using the same bar coater. Next, water cleaning using a foundry coater and water draining using an air knife were repeated on the obtained support three times, and then the support was transported and dried in a drying zone at 70° C. for 10 seconds. As a result, the support having undergone the alkali saponification treatment was obtained.

<Alkali Solution>

| | |
|---|---|
| Potassium hydroxide | 4.70 parts by mass |
| Water | 15.80 parts by mass |
| Isopropanol | 63.70 parts by mass |
| Surfactant | 1.0 part by mass |
| SF-1: $C_{14}H_{29}O(CH_2CH_2O)_2OH$ | |
| Propylene glycol | 14.8 parts by mass |

(Formation of Undercoat Layer)

The following undercoat layer-forming coating solution was continuously applied to the support having undergone the alkali saponification treatment using a #8 wire bar. The support on which the coating film was formed was dried using warm air at 60° C. for 60 seconds and was dried using warm air at 100° C. for 120 seconds. As a result, an undercoat layer was formed.

<Undercoat Layer-Forming Coating Solution>

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

-Modified Polyvinyl Alcohol-

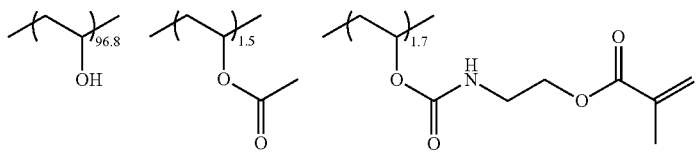

Modified Polyvinyl Alcohol (Formation of Alignment Film P-1)

The following alignment film P-1-forming coating solution was continuously applied to the support on which the above-described undercoat layer was formed using a #2 wire bar. The support on which the coating film of the alignment film P-1-forming coating solution was formed was dried using warm air at 60° C. for 60 seconds. As a result, an alignment film P-1 was formed.

<Alignment Film P-1-Forming Coating Solution>

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

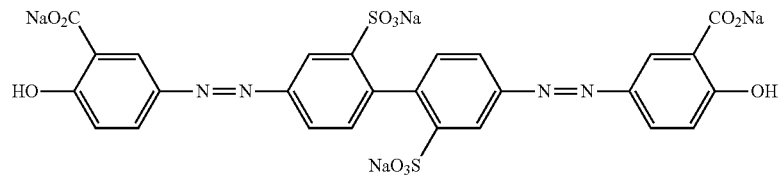

(Exposure of Alignment Film P-1)

The alignment film was exposed using the exposure device 90 illustrated in FIG. 17. In the exposure device 90, a laser that emits laser light having a wavelength of 405 nm was used as the semiconductor laser 91. The exposure dose of the interference light was 100 mJ/cm$^2$. The 180° rotation pitch of a pattern formed by interference of two laser beams was controlled by changing an intersection angle α between the two beams.

(Formation of Optically-Anisotropic Layer O-1)

As the optically-anisotropic layer, a layer formed of a reverse dispersion liquid crystal compound was formed. The optically-anisotropic layer was formed by applying multiple layers of the following composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 110° C., the coating film was cooled to 60° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition A-1 was applied to the first liquid crystal layer, and the applied composition A-1 was heated, cooled, and irradiated with ultraviolet light for curing under the same conditions as those of the preparation of the first liquid crystal layer. As a result, a liquid crystal immobilized layer was prepared. This way, by repeating the application multiple times until the total thickness reached a desired thickness, an optically-anisotropic layer O-1 was obtained. Finally, Re(550) of the liquid crystals was 138 nm, and it was verified using a polarizing microscope that periodic alignment occurred on the surface. Here, Re(550) refers to an in-plane retardation generated by refractive index anisotropy of the liquid crystal compound with respect to incidence light having a wavelength of 550 nm in the optically-anisotropic layer O-1, and corresponds to the product of a difference $\Delta n_{550}$ in refractive index generated by refractive index anisotropy of the liquid crystal compound at a wavelength of 550 nm and a thickness d of the optically-anisotropic layer O-1. In addition, the optically-anisotropic layer O-1 satisfied a relationship of $$(\Delta n_{450} \times d)/(\Delta n_{550} \times d) < 1.00.$$

<Composition A-1>

| | |
|---|---|
| The following liquid crystal compound L-1 | 42.00 parts by mass |
| The following liquid crystal compound L-2 | 42.00 parts by mass |
| The following liquid crystal compound L-3 | 16.00 parts by mass |
| The following polymerization initiator PI-1 | 0.50 parts by mass |
| The following leveling agent T-1 | 0.50 parts by mass |
| Methyl ethyl ketone | 176.00 parts by mass |
| Cyclopentanone | 44.00 parts by mass |

-Liquid Crystal Compound L-1-

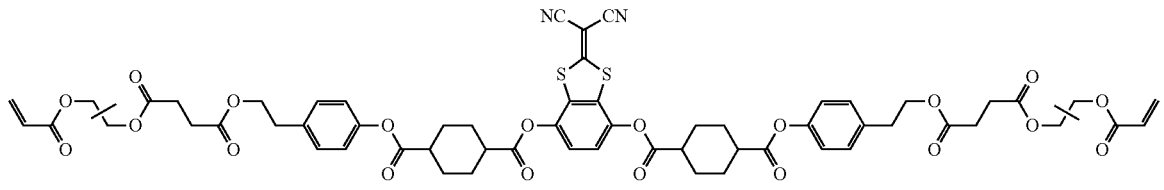

Me Position Isomer Mixture

-Liquid Crystal Compound L-2-

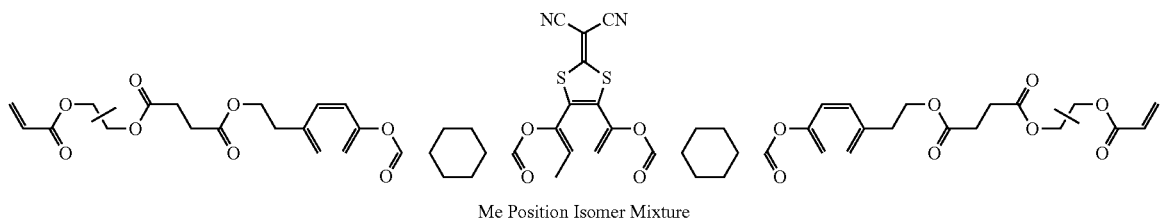

Me Position Isomer Mixture

-Liquid Crystal Compound L-3-

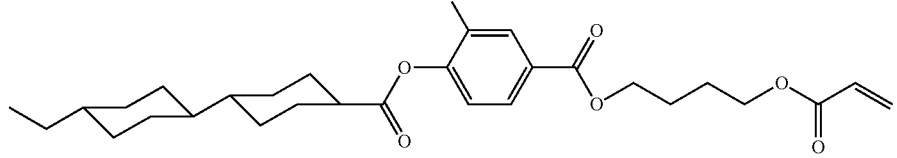

-Polymerization initiator PI-1-

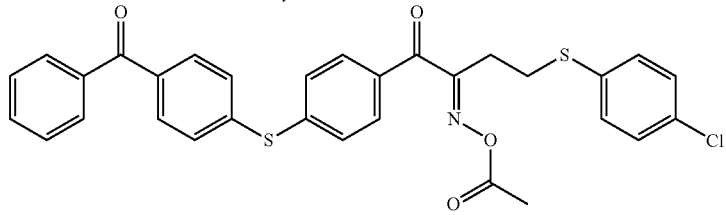

-Leveling Agent T-1-

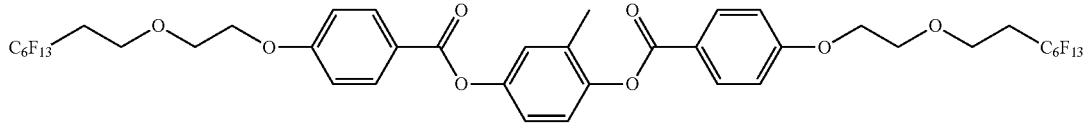

Example 2

Two sheets in which the optically-anisotropic layer O-1 was formed on the support using the same method as that of Example 1 were prepared. The prepared two sheets were disposed and bonded using SK DINE (registered trade name, manufactured by Soken Chemical & Engineering Co., Ltd.) such that surfaces of the two sheets where the optically-anisotropic layer was formed faced inward and the sheets were perpendicular to each other in a plane.

Example 3

Three sheets in which the optically-anisotropic layer O-1 was formed on the support were prepared using the same method as that of Example 1. The prepared three sheets were disposed and bonded using SK DINE (registered trade name, manufactured by Soken Chemical & Engineering Co., Ltd.) such that an angle between the three sheets in a plane was 60°. The optically-anisotropic layer of the second sheet was bonded to the optically-anisotropic layer of the first sheet, the support layer of the second sheet was released, and the optically-anisotropic layer of the third sheet was bonded thereto.

Example 4

An optically-anisotropic layer B-1 was formed using the same method as that of Example 1, except that an exposure method of the alignment film P-1 was changed as follows.

(Exposure of Alignment Film P-1)

The alignment film was exposed using the exposure device 110 illustrated in FIG. 18. In the exposure device 110, a laser that emits laser light having a wavelength of 405 nm was used as the semiconductor laser 111. The exposure dose of the interference light was 100 mJ/cm$^2$. In addition, the exposure was performed using a mask having a quadrangular hole such that a portion other than the hole was not exposed. The exposure of the alignment film P-1 was performed by shifting the mask and repeating a step of exposing an adjacent portion. The rotation pitch of the pattern formed by interference between the two laser beams was controlled by changing the F number of the lens, the focal length of the lens, and the distance between the lens and the alignment film P-1 surface.

Example 5

An optically-anisotropic layer O-2 formed of a cured layer of a liquid crystal composition having forward dispersibility was used instead of the optically-anisotropic layer O-1 according to Example 2. During the preparation of the optically-anisotropic layer O-2, the following composition A-2 was used instead of the composition A-1 in the step of preparing the optically-anisotropic layer O-1 according to Example 1. A method of applying multiple layers of the composition A-2 to the alignment film P-1 according to Example 5 was the same as that of Example 1, except that the heating temperature on the hot plate was 90° C.

<Composition A-2>

| | |
|---|---|
| The above-described liquid crystal compound L-4 | 100.00 parts by mass |
| Polymerization initiator (IRGACURE (registered trade name) 907, manufactured by BASFSE) | 3.00 parts by mass |
| Photosensitizer (KAYACURE DETX-S, manufactured by Nippon Kayaku Co., Ltd.) | 1.00 part by mass |
| Leveling agent T-1 | 0.50 parts by mass |
| Methyl ethyl ketone | 211.00 parts by mass |

-Liquid Crystal Compound L-4-

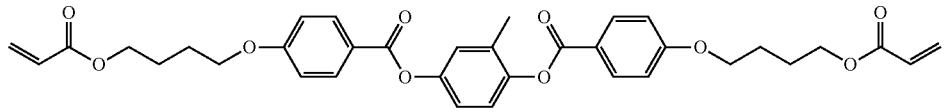 [SMILES: C=CC(=O)OCCCCOc1ccc(C(=O)Oc2ccc(OC(=O)c3ccc(OCCCCOC(=O)C=C)cc3)c(C)c2)cc1]  [84%]

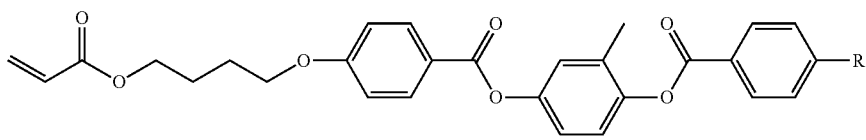  [14%]

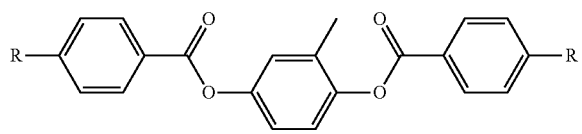  [2%]

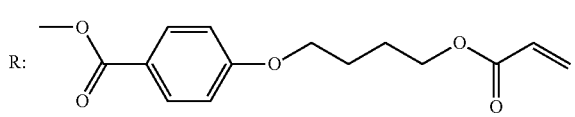

Example 6

The optically-anisotropic layer O-1 was prepared using the same method as the method of preparing the optical element according to Example 2, except that the in-plane retardation Re(550) of the liquid crystals was 275 nm.

[Evaluation]

The prepared optical element was evaluated as follows.

A head-mounted display (Playstation VR, manufactured by Sony Interactive Entertainment Inc.) was disassembled, a sheet (microlens array) bonded to an image display portion was removed, and the optical element according to any one of Examples 1 to 6 was bonded to the image display portion. At this time, the surface of the optical element on the optical element on the support side was bonded to the display portion through a pressure sensitive adhesive. The disassembled head-mounted display was assembled again, an image was displayed on the image display portion, and the image was observed through the eyepiece to perform the following evaluation.

<Evaluation of Visibility of Pixel Grid>

By using a white solid image as the image to be displayed on the image display portion, the pixel grid was observed by visual inspection, and function evaluation was performed based on the following four grades. In addition, the head-mounted display used for the evaluation includes the pixel grid having a grid shape. Therefore, the visibility of the pixel grid in a vertical direction and a horizontal direction of the image to be visually recognized in a state where the head-mounted display was mounted was evaluated. It is preferable that the pixel grid is not visually recognized.

A: the grid was not visually recognized

B: the grid was visually recognized, but the degree thereof was small

C: the grid was visually recognized, but the degree thereof was in an allowable range D: the grid was clearly visually recognized <Image Clarity Evaluation>

By displaying a black background and a white line having one-pixel width on the image display portion of the head-mounted display, the degree of blurriness of the white line was observed by visual inspection, and function evaluation was performed based on the following four grades.

A: the blurriness of the white line was not visually recognized

B: the blurriness of the white line was visually recognized, but the degree thereof was small C: the blurriness of the white line was visually recognized, but the degree thereof was in an allowable range D: the blurriness of the white line was conspicuous

Comparative Example 1

A head-mounted display (Playstation VR, manufactured by Sony Interactive Entertainment Inc.) was disassembled, and a sheet (microlens array) bonded to an image display portion was removed. In this state, the head-mounted display was assembled again. An image was displayed on the image display portion of the head-mounted display, and the image was observed through the eyepiece to perform the above-described evaluation.

Comparative Example 2

In a head-mounted display (Playstation VR, manufactured by Sony Interactive Entertainment Inc.), an image was displayed without removing a sheet (microlens array) bonded to an image display portion, and the image was observed through the eyepiece to perform the above-described evaluation.

The evaluation results of Examples 1 to 6 and Comparative Examples 1 and 2 are shown in the following table. In Table 1, a type A of the optically-anisotropic layer (refer to FIG. 4) represents the optically-anisotropic layer having the liquid crystal alignment pattern AP1 according to Embodiment 1, and a type B of the optically-anisotropic layer represents the optically-anisotropic layer (refer to FIGS. 13 and 14) having the liquid crystal alignment pattern AP2 according to Embodiment 3.

which the pixels were arranged. Thus, it is presumed that the pixel grid was able to be effectively prevented from being visually recognized by the user, and the result of the visibility evaluation of the pixel grid was "A". In addition, light transmitted through the optically-anisotropic layer according to any one of Examples 2 to 4 and 6 was not scattered light corresponding to secondary or higher diffracted light. Therefore, it is presumed that light components emitted from pixels adjacent to each other in the head-mounted

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Configuration | Kind of Optical Element | Optically-Anisotropic Layer Type A | Optically-Anisotropic Layer Type A | Optically-Anisotropic Layer Type A | Optically-Anisotropic Layer Type B | Optically-Anisotropic Layer Type A | Optically-Anisotropic Layer Type A | None | Microlens Array |
| | Number of Optically-Anisotropic Layers | 1 | 2 | 3 | 1 | 2 | 2 | — | — |
| | Composition | A-1 | A-1 | A-1 | A-1 | A-2 | A-1 | — | — |
| | Re(550) [nm] | 138 | 138 | 138 | 138 | 138 | 275 | — | — |
| | Re(450)/Re(550) | 0.86 | 0.86 | 0.86 | 0.86 | 1.09 | 0.86 | — | — |
| | Pitch [μm] of Liquid Crystal Alignment Pattern | 8.4 | 8.4 | 8.4 | 17.4 | 8.4 | 16.8 | — | — |
| Effect | Visibility of Pixel Grid (Horizontal Direction) | A | A | A | A | B | A | D | A |
| | Visibility of Pixel Grid (Vertical Direction) | C | A | B | A | B | A | D | A |
| | Image Clarity | A | A | A | A | A | A | A | C |

In Table 1, as the pitch of the liquid crystal alignment pattern according to Example 4 included in the type B of the optically-anisotropic layer, an average pitch of the liquid crystal alignment pattern at a position at a distance of ¼ of the arrangement pitch NP of the optical component N from the in-plane center of the optical component N was shown.

As shown in Table 1, in Examples 2 to 6, the results of the visibility evaluation and the image clarity evaluation of the pixel grid were "B" or higher, and the pixel grid was able to be prevented from being visually recognized by the user while maintaining the clarity of the image displayed on the head-mounted display. In particular, in Examples 2, 4, and 6, the results of all the evaluation items were "A", the clarity of the image was excellent, and the pixel grid was able to be prevented from being visually recognized by the user.

On the other hand, in Example 1, the results of the visibility evaluation of the pixel grid in the horizontal direction and the image clarity evaluation were "A", but the result of the visibility evaluation of the pixel grid in the vertical direction was "C". In addition, in Comparative Example 1, the result of the image clarity evaluation was "A", but the results of the visibility evaluation of the pixel grid in the horizontal direction and the vertical direction were "D". In Comparative Example 2, the results of the visibility evaluation of the pixel grid in the horizontal direction and the vertical direction were "A", but the result of the image clarity evaluation was "C".

In Examples 2, 4, and 6 in which the results of all the evaluation items were "A", the direction in which the direction of the optical axis derived from the liquid crystal compound in the optically-anisotropic layer changed while continuously rotating in the optically-anisotropic layer was parallel to a periodic direction of the pixel grid, that is, a direction in which the pixels were arranged. Therefore, it is presumed that light that was incident from the display panel and was bent by the optically-anisotropic layer advanced in a state where it was bent to be inclined in the direction in display were not mixed with each other more than necessary. Thus, it is presumed that the blurriness of the white line was not visually recognized by the user on the image displayed on the image display portion of the head-mounted display and the result of the image clarity evaluation was "A".

In Example 1, the direction in which the direction of the optical axis derived from the liquid crystal compound in the optically-anisotropic layer changed while continuously rotating in the optically-anisotropic layer was only one direction. Therefore, the result of the visibility evaluation of the pixel grid in the vertical direction was "C". However, the result of the visibility evaluation of the pixel grid in the horizontal direction was "A" due to the same reason as that of Examples 2, 4, and 6. In addition, the result of the image clarity evaluation was also "A". As a result, it can be said that the optical element according to Example 1 is excellent without any problems in practice.

In addition, in Example 3, by laminating the three optically-anisotropic layers to be rotated from each other by 60°, the directions in which the direction of the optical axis derived from the liquid crystal compound in the optically-anisotropic layer changed while continuously rotating in the optically-anisotropic layer were not perpendicular to each other. Therefore, it is presumed that one direction among the directions in which the plurality of pixels were arranged in the display panel was not parallel to the direction in which the direction of the optical axis changed while continuously rotating, and the result of the visibility evaluation of the pixel grid in the vertical direction was "B". However, the result of the visibility evaluation of the pixel grid in the horizontal direction was "A" due to the same reason as that of Examples 2, 4, and 6. In addition, the result of the image clarity evaluation was also "A". As a result, it can be said that the optical element according to Example 3 is excellent without any problems in practice.

In addition, in Example 5, the optically-anisotropic layer was formed of the liquid crystal compound having forward dispersibility. Therefore, the range corresponding to the wavelength of visible light was narrower than that of the optically-anisotropic layer formed of the liquid crystal compound having reverse dispersibility. Thus, it is presumed that the amount of light that was incident from the display panel and was bent by the optically-anisotropic layer was less than that of the optically-anisotropic layer formed of the liquid crystal compound having reverse dispersibility, and the results of the visibility evaluation of the pixel grid in the horizontal direction and the vertical direction were "B". However, in the optical element according to Example 5, the pixel grid was sufficiently prevented from being visually recognized by the user, and the result of the image clarity evaluation was "A". Therefore, it can be said that the optical element was excellent.

In Comparative Example 1, the optical element was provided between the display panel and the eyepiece. Therefore, light emitted from the display panel through the pixels was directly incident into the eyepiece. Thus, it is presumed that light components emitted from the display panel through the plurality of pixels were not likely to be mixed with each other, and the result of the image clarity evaluation was "A". However, since the portion corresponding to the pixel grid was enlarged by the eyepiece as it was, the pixel grid was visually recognized by the user. Therefore, the results of the visibility evaluation of the pixel grid in the horizontal direction and the vertical direction were "D", and it can be said that Comparative Example 1 is not preferable in practice.

In Comparative Example 2, the microlens array was disposed between the display panel and the eyepiece. Therefore, it is presumed that light emitted from the display panel through the plurality of pixels was diffused by the microlens array in the direction in which the plurality of pixels were arranged. Thus, the results of the visibility evaluation of the pixel grid in the horizontal direction and the vertical direction were "A". However, in a case where light emitted from the display panel transmitted through the microlens array, secondary or higher diffracted light was generated from respective boundary surfaces between microlenses. Therefore, light components emitted through the plurality of pixels were likely to be mixed with each other. As a result, the blurriness of the white line displayed on the head-mounted display was conspicuous, and the result of the image clarity evaluation was "C", and which is not preferable in practice.

It can be seen from the above-described results that, with the wearable display device according to the embodiment of the present invention, the pixel grid can be prevented from being visually recognized by the user while maintaining the sharpness of an image to be displayed on the display panel.

Explanation of References

1: wearable display device
11, 41: display panel
12, 42: pixel
12B, 42B: blue pixel
12G, 42G: green pixel
12R, 42R: red pixel
13, 43: pixel grid
21, 71, 81: optical element
22, 82, 100: support
23, 53, 63, 73, 83: optically-anisotropic layer
24, 54, 64, 74: rod-shaped liquid crystal compound
24A, 54A, 64A, 74A, 84A: optical axis
31: eyepiece
84: disk-shaped liquid crystal compound
90: exposure device
91, 111: semiconductor laser
92, 112: light source
93: beam splitter
94A, 94B, 114A, 114B: mirror
95A, 95B, 117: $\lambda/4$ plate
101: alignment film
113: first polarization beam splitter
115: lens
116: second polarization beam splitter
A, $A_1$, $A_2$, $A_3$, $A_4$, $A_5$: arrangement axis
AP1, AP2, AP3: liquid crystal alignment pattern
d: thickness
DL: distance
DP: pixel pitch
E1, E2: equiphase surface
$L_1$, $L_{11}$, $L_{21}$, $L_{31}$, $L_{41}$: incidence light
$L_2$, $L_3$, $L_{12}$, $L_{13}$, $L_{22}$, $L_{23}$, $L_{24}$, $L_{32}$, $L_{33}$, $L_{34}$, $L_{42}$, $L_{43}$, $L_{44}$, $L_{45}$, $L_{46}$, $L_{47}$: transmitted light
M: laser light
MA, MB, MP, MS: beam
N: optical component
NP: arrangement pitch
P: pitch
$P_L$: left circularly polarized light
$P_R$: right circularly polarized light
$P_O$: linearly polarized light
$P_P$: P polarized light
$P_S$: S polarized light
Q1, Q2: absolute phase
R: region
α: intersection angle

What is claimed is:

1. A wearable display device comprising:
a display panel that includes a plurality of pixels and a pixel grid disposed between the plurality of pixels adjacent to each other;
an eyepiece for collecting light emitted from the display panel through the plurality of pixels; and
an optical element that is disposed between the display panel and the eyepiece,
wherein the optical element includes an optically-anisotropic layer that is formed of a cured layer of a composition including liquid crystal compounds, and
the optically-anisotropic layer has a liquid crystal alignment pattern in which directions of optical axes derived from the liquid crystal compounds change while continuously rotating along at least one in-plane direction of the optically-anisotropic layer, a difference between angles of the optical axes of the liquid crystal compounds adjacent to each other along the at least one in-plane direction being 45° or less.

2. The wearable display device according to claim 1, wherein in a case where a difference in refractive index generated by refractive index anisotropy of the liquid crystal compounds at a wavelength of 550 nm is represented by $\Delta n_{550}$ and a thickness of the optically-anisotropic layer is represented by d, the following Expression (1) is satisfied, $$50\text{nm} \leq \Delta n_{550} \times d \leq 350\text{nm} \tag{1}$$

3. The wearable display device according to claim 1, wherein in a case where a difference in refractive index generated by refractive index anisotropy of the liquid crystal compounds at a wavelength of 450 nm is represented by $\Delta n_{550}$, a difference in refractive index generated by refractive index anisotropy of the liquid crystal compounds at a wavelength of 550 nm is represented by $\Delta n_{550}$, and a thickness of the optically-anisotropic layer is represented by d, the following Expression (2) is satisfied, $$(\Delta n_{450} \times d)/(\Delta n_{550} \times d) < 1.00 \tag{2}.$$

4. The wearable display device according to claim 2, wherein in a case where a difference in refractive index generated by refractive index anisotropy of the liquid crystal compounds at a wavelength of 450 nm is represented by $\Delta n_{450}$, a difference in refractive index generated by refractive index anisotropy of the liquid crystal compounds at a wavelength of 550 nm is represented by $\Delta n_{550}$, and a thickness of the optically-anisotropic layer is represented by d, the following Expression (2) is satisfied, $$(\Delta n_{450} \times d)/(\Delta n_{550} \times d) < 1.00 \tag{2}.$$

5. The wearable display device according to claim 1, wherein the liquid crystal compounds are rod-shaped liquid crystal compounds.

6. The wearable display device according to claim 2, wherein the liquid crystal compounds are rod-shaped liquid crystal compounds.

7. The wearable display device according to claim 3, wherein the liquid crystal compounds are rod-shaped liquid crystal compounds.

8. The wearable display device according to claim 4, wherein the liquid crystal compounds are rod-shaped liquid crystal compounds.

9. The wearable display device according to claim 1, wherein the liquid crystal compounds are disk-shaped liquid crystal compounds.

10. The wearable display device according to claim 2, wherein the liquid crystal compounds are disk-shaped liquid crystal compounds.

11. The wearable display device according to claim 3, wherein the liquid crystal compounds are disk-shaped liquid crystal compounds.

12. The wearable display device according to claim 4, wherein the liquid crystal compounds are disk-shaped liquid crystal compounds.

13. The wearable display device according to claim 1, wherein the direction in which the directions of the optical axes change while continuously rotating is parallel to a direction in which the plurality of pixels of the display panel are arranged.

14. The wearable display device according to claim 2, wherein the direction in which the directions of the optical axes change while continuously rotating is parallel to a direction in which the plurality of pixels of the display panel are arranged.

15. The wearable display device according to claim 3, wherein the direction in which the directions of the optical axes change while continuously rotating is parallel to a direction in which the plurality of pixels of the display panel are arranged.

16. The wearable display device according to claim 4, wherein the direction in which the directions of the optical axes change while continuously rotating is parallel to a direction in which the plurality of pixels of the display panel are arranged.

17. The wearable display device according to claim 5, wherein the direction in which the directions of the optical axes change while continuously rotating is parallel to a direction in which the plurality of pixels of the display panel are arranged.

18. The wearable display device according to claim 6, wherein the direction in which the directions of the optical axes change while continuously rotating is parallel to a direction in which the plurality of pixels of the display panel are arranged.

19. The wearable display device according to claim 9, wherein the direction in which the directions of the optical axes change while continuously rotating is parallel to a direction in which the plurality of pixels of the display panel are arranged.

20. The wearable display device according to claim 10, wherein the direction in which the directions of the optical axes change while continuously rotating is parallel to a direction in which the plurality of pixels of the display panel are arranged.

* * * * *